(12) United States Patent
Yamaguchi et al.

(10) Patent No.: US 7,946,121 B2
(45) Date of Patent: May 24, 2011

(54) AIR CONDITIONER

(75) Inventors: Takahiro Yamaguchi, Sakai (JP);
Tadafumi Nishimura, Sakai (JP);
Manabu Yoshimi, Sakai (JP); Shinichi Kasahara, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 424 days.

(21) Appl. No.: 12/096,693

(22) PCT Filed: Dec. 12, 2006

(86) PCT No.: PCT/JP2006/324708
§ 371 (c)(1),
(2), (4) Date: Jun. 9, 2008

(87) PCT Pub. No.: WO2007/069578
PCT Pub. Date: Jun. 21, 2007

(65) Prior Publication Data
US 2009/0126379 A1  May 21, 2009

(30) Foreign Application Priority Data

Dec. 16, 2005  (JP) .................................. 2005-363732

(51) Int. Cl.
*F25B 45/00* (2006.01)
*F25B 49/00* (2006.01)
(52) U.S. Cl. .......................................... 62/127; 62/149
(58) Field of Classification Search .................... 62/127, 62/129, 149
See application file for complete search history.

(56) References Cited

U.S. PATENT DOCUMENTS

| | | | | |
|---|---|---|---|---|
| 6,681,582 B2 * | 1/2004 | Suzuki et al. | ................... | 62/129 |
| 7,752,855 B2 * | 7/2010 | Matsuoka et al. | ............... | 62/149 |
| 2006/0101835 A1 * | 5/2006 | Meldahl et al. | ................. | 62/149 |
| 2009/0044550 A1 * | 2/2009 | Nishimura et al. | ............. | 62/149 |

FOREIGN PATENT DOCUMENTS

| JP | 03-186170 A | 8/1991 |
|---|---|---|
| JP | 04-148170 A | 5/1992 |
| JP | 2000-039237 A | 2/2000 |
| JP | 2000-304388 A | 11/2000 |
| JP | 2001-027461 A | 1/2001 |

(Continued)

OTHER PUBLICATIONS

Korean Office Action of the corresponding Korean Application No. 10-2008-7014793 dated May 20, 2010.

(Continued)

*Primary Examiner* — Marc E Norman
(74) *Attorney, Agent, or Firm* — Global IP Counselors

(57) ABSTRACT

An air conditioner includes a refrigerant circuit, a refrigerant quantity calculating section, and a refrigerant quantity judging section. The refrigerant circuit is configured by the interconnection of a compressor, an outdoor heat exchanger, and an indoor heat exchanger. The refrigerant quantity calculating section uses a relational expression between the refrigerant quantity in each portion of the refrigerant circuit when the refrigerant circuit is divided into a plurality of portions and an operation state quantity of constituent equipment or refrigerant flowing in the refrigerant circuit in order to calculate the refrigerant quantity in each portion from the operation state quantity of constituent equipment or refrigerant flowing in the refrigerant circuit. The refrigerant quantity judging section uses the refrigerant quantity in each portion calculated by the refrigerant quantity calculating section in order to judge the adequacy of the refrigerant quantity in the refrigerant circuit.

12 Claims, 10 Drawing Sheets

FOREIGN PATENT DOCUMENTS

JP 2005-098642 A 4/2005

OTHER PUBLICATIONS

Kenichi Hashizume; Flow pattern and void ratio of refrigerant; Transactions of the Japan Society of Mechanical Engineers; Series B, vol. 49, No. 437, pp. 189-196; Japan;1983.

Minoru Shiotani et al.; Multivariate statistical analysis theory; Kyoritsu Shuppan; Series A, 5-3; Japan; 1967.

ANSI/ARI Standard 540-1999; Positive Displacement Refrigerant Compressors and Compressor Units; Virginia; 1999.

* cited by examiner

AIR CONDITIONER

CROSS-REFERENCE TO RELATED APPLICATIONS

This U.S. National stage application claims priority under 35 U.S.C. §119(a) to Japanese Patent Application No. 2005-363732, filed in Japan on Dec. 16, 2005, the entire contents of which are hereby incorporated herein by reference.

TECHNICAL FIELD

The present invention relates to a function to judge the adequacy of the refrigerant quantity in a refrigerant circuit of an air conditioner. More specifically, the present invention relates to a function to judge the adequacy of the refrigerant quantity in a refrigerant circuit of an air conditioner configured by the interconnection of a compressor, a heat source side heat exchanger, an expansion mechanism, and a utilization side heat exchanger.

BACKGROUND ART

Conventionally, an approach has been proposed in which a simulation of refrigeration cycle characteristics is performed and the excess or deficiency of the refrigerant quantity is judged by using a result of the calculation, in order to judge the excess or deficiency of the refrigerant quantity in a refrigerant circuit of an air conditioner (for example, see JP-A Publication No. 2000-304388).

SUMMARY OF THE INVENTION

However, with the approach to judge the excess or deficiency of the refrigerant quantity through the simulation of refrigeration cycle characteristics as described above, an enormous amount of calculation is necessary. Also, typically, with a low-cost calculation device such as a microcomputer and the like installed in the air conditioner, the calculation time is long. In addition, the calculation itself might be impossible to be carried out.

An object of the present invention is to judge the adequacy of the refrigerant quantity in the refrigerant circuit with high accuracy while reducing the calculation load.

An air conditioner according to a first aspect of the present invention includes a refrigerant circuit, refrigerant quantity calculating means or section, and refrigerant quantity judging means or section. The refrigerant circuit is configured by the interconnection of a compressor, a heat source side heat exchanger, and a utilization side heat exchanger. The refrigerant quantity calculating means uses a relational expression between the refrigerant quantity in each portion of the refrigerant circuit when refrigerant circuit is divided into a plurality of portions and an operation state quantity of constituent equipment or refrigerant flowing in the refrigerant circuit in order to calculate the refrigerant quantity in each portion from the operation state quantity of constituent equipment or refrigerant flowing in the refrigerant circuit. The refrigerant quantity judging means uses the refrigerant quantity in each portion calculated by the refrigerant quantity calculating means in order to judge the adequacy of the refrigerant quantity in the refrigerant circuit.

In this air conditioner, the refrigerant circuit is divided into a plurality of portions, and the relational expression between the refrigerant quantity in each portion and the operation state quantity is set. Consequently, compared to the conventional case where a simulation of refrigeration cycle characteristics is performed, the calculation load can be reduced, and an operation state quantity that is important for calculation of the refrigerant quantity in each portion can be selectively incorporated as a variable of the relational expression, thus improving the calculation accuracy of the refrigerant quantity in each portion. As a result, the adequacy of the refrigerant quantity in the refrigerant circuit can be judged with high accuracy. Here, the "operation state quantity of constituent equipment or refrigerant flowing in the refrigerant circuit" refers to state quantities such as the temperature, pressure, and the like of the refrigerant flowing in the refrigerant circuit and state quantities of equipment constituting the air conditioner.

An air conditioner according to a second aspect of the present invention is the air conditioner according to the first aspect of the present invention, wherein the refrigerant circuit is configured by a heat source unit including the compressor and the heat source side heat exchanger; a utilization unit including the utilization side heat exchanger; and a refrigerant communication pipe that interconnects the heat source unit and the utilization unit. The relational expressions are separately set for the refrigerant communication pipe and a portion other than the refrigerant communication pipe as the refrigerant circuit is divided into these portions.

In this air conditioner, the refrigerant circuit is divided into the refrigerant communication pipe where the refrigerant quantity changes depending on conditions such as an installation location and the like and the portion other than the refrigerant communication pipe, and the relational expressions between the refrigerant quantity in each portion and the operation state quantity are set. Thus, as the relational expression for calculating the refrigerant quantity in the portion other than the refrigerant communication pipe, it is possible to use the relational expressions in which a calculation error due to the change in the refrigerant quantity in the refrigerant communication pipe is not easily generated. As a result, the accuracy for judging the adequacy of the refrigerant quantity in the refrigerant circuit can be further improved.

An air conditioner according to a third aspect of the present invention is the air conditioner according to the second aspect of the present invention, wherein the relational expressions are separately set for the heat source unit and the utilization unit as the portion other than the refrigerant communication pipe is divided into these portions.

In this air conditioner, the portion other than the refrigerant communication pipe is divided into the heat source unit and the utilization unit, and the relational expressions between the refrigerant quantity in each portion and the operation state quantity are set. Thus, even when the heat source unit and the utilization unit are interconnected in various combinations, the relational expressions separately provided for the heat source unit and the utilization unit can be used. As a result, the accuracy for judging the adequacy of the refrigerant quantity in the refrigerant circuit can be further improved.

An air conditioner according to a fourth aspect of the present invention is the air conditioner according to the third aspect of the present invention, wherein the relational expressions are separately set for the heat source side heat exchanger and a portion other than the heat source side heat exchanger as the heat source unit is divided into these portions. The relational expression set for the refrigerant quantity in the heat source side heat exchanger includes a refrigerant circulation flow rate or an operation state quantity equivalent to the refrigerant circulation flow rate as the operation state quantity of constituent equipment or refrigerant flowing in the refrigerant circuit.

In this air conditioner, the heat source unit is divided into the heat source side heat exchanger and the portion other than the heat source side heat exchanger, and the relational expressions between the refrigerant quantity in each portion and the operation state quantity are set. Also, as the operation state quantity used in the relational expression for calculating the refrigerant quantity in the heat source side heat exchanger, a refrigerant circulation flow rate or an operation state quantity equivalent to the refrigerant circulation flow rate is included. Thus, it is possible to prevent a calculation error due to the difference in the refrigerant circulation flow rate from being easily generated. As a result, the accuracy for judging the adequacy of the refrigerant quantity in the refrigerant circuit can be further improved.

An air conditioner according to a fifth aspect of the present invention is the air conditioner according to the third or fourth aspect of the present invention, wherein the utilization unit further includes a ventilation fan that supplies air to the utilization side heat exchanger. The relational expression set for the refrigerant quantity in the utilization unit includes an air flow rate of the ventilation fan or an operation state quantity equivalent to the air flow rate as the operation state quantity of constituent equipment or refrigerant flowing in the refrigerant circuit.

In this air conditioner, as the operation state quantity used in the relational expression for calculating the refrigerant quantity in the utilization unit, an air flow rate of the ventilation fan or an operation state quantity equivalent to the air flow rate is included. Thus, it is possible to prevent a calculation error due to the difference in the air flow rate from being easily generated. As a result, the accuracy for judging the adequacy of the refrigerant quantity in the refrigerant circuit can be further improved.

An air conditioner according to a sixth aspect of the present invention is the air conditioner according to any one of the first through fifth aspects of the present invention, wherein the refrigerant quantity calculating means uses the relational expressions in order to calculate the refrigerant quantity in each portion from the operation state quantity of constituent equipment or refrigerant flowing in the refrigerant circuit in an automatic refrigerant charging operation in which the refrigerant is charged into the refrigerant circuit. The refrigerant quantity judging means uses the refrigerant quantity in each portion calculated by the refrigerant quantity calculating means in order to judge whether or not the refrigerant quantity in the refrigerant circuit has reached a target charge value.

In this air conditioner, during the automatic refrigerant charging operation, the refrigerant quantity can be quickly calculated, and moreover, whether or not the refrigerant quantity in the refrigerant circuit has reached the target charge value can be judged with high accuracy.

An air conditioner according to a seventh aspect of the present invention is the air conditioner according to any one of the first through sixth aspects of the present invention, wherein the refrigerant quantity calculating means uses the relational expressions in order to calculate the refrigerant quantity in each portion from the operation state quantity of constituent equipment or refrigerant flowing in the refrigerant circuit in an initial refrigerant quantity detection operation in which the initial refrigerant quantity after constituent equipment is installed or after the refrigerant is charged into the refrigerant circuit is detected, and thereby detects the initial refrigerant quantity.

In this air conditioner, during the initial refrigerant quantity detection operation, the refrigerant quantity can be quickly calculated, and moreover, the initial refrigerant quantity can be detected with high accuracy.

An air conditioner according to an eighth aspect of the present invention is the air conditioner according to any one of the first through seventh aspects of the present invention, wherein the refrigerant quantity calculating means uses the relational expressions in order to calculate the refrigerant quantity in each portion from the operation state quantity of constituent equipment or refrigerant flowing in the refrigerant circuit in a refrigerant leak detection operation in which whether or not the refrigerant is leaking from the refrigerant circuit is judged. The refrigerant quantity judging means compares the refrigerant quantity in each portion calculated by the refrigerant quantity calculating means with a reference refrigerant quantity that serves as the reference for judging whether or not there is a leak, and thereby judges whether or not the refrigerant is leaking from the refrigerant circuit.

In this air conditioner, during the refrigerant leak detection operation, the refrigerant quantity can be quickly calculated, and moreover, whether or not the refrigerant is leaking from the refrigerant circuit can be judged with high accuracy.

DETAILED DESCRIPTION OF THE INVENTION

In the following, an embodiment of an air conditioner according to the present invention is described based on the drawings.

(1) Configuration of the Air Conditioner

Figure 1:
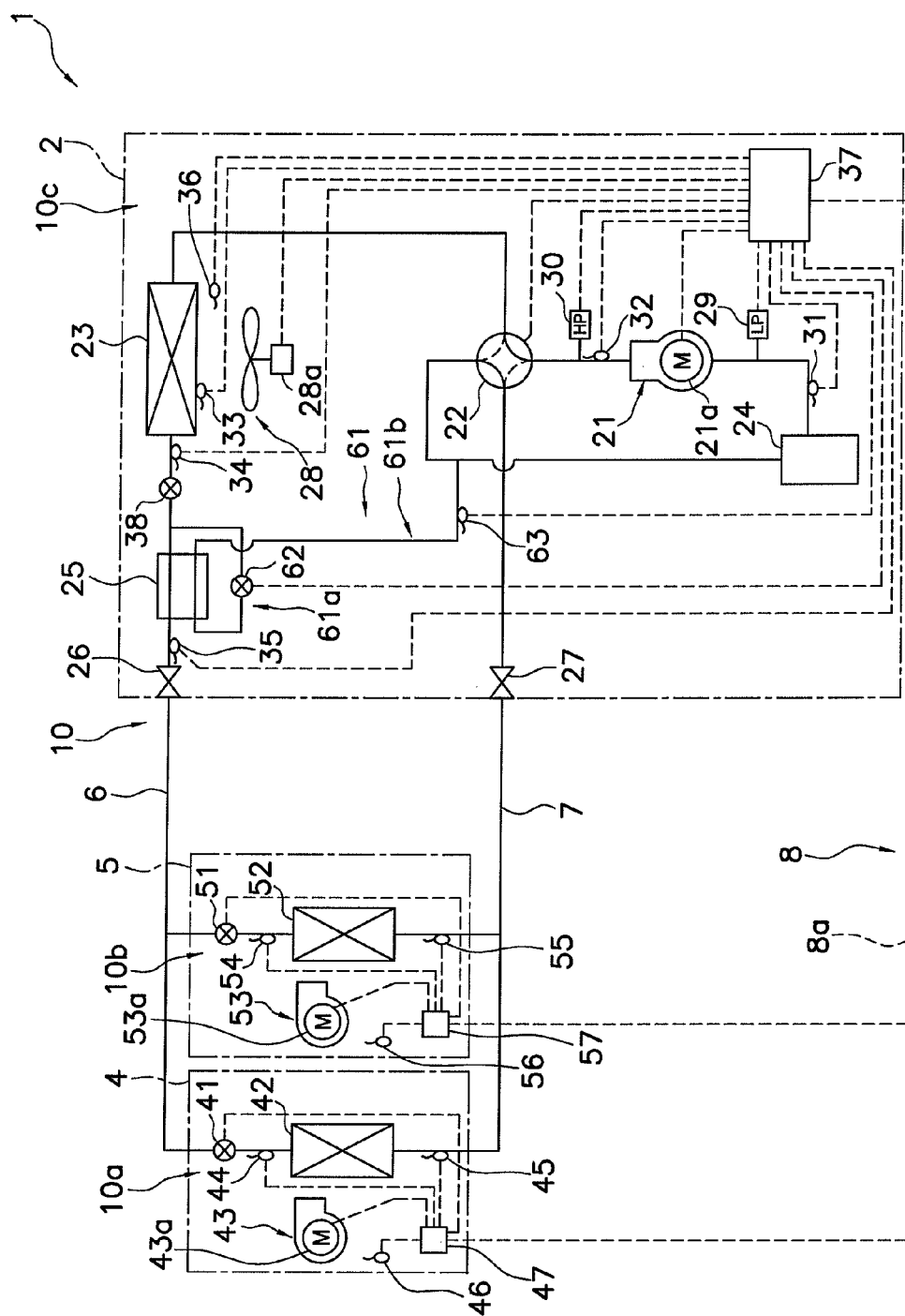
FIG. 1 is a schematic configuration view of an air conditioner according to an embodiment of the present invention.

FIG. 1 is a schematic configuration view of an air conditioner 1 according to an embodiment of the present invention. The air conditioner 1 is a device that is used to cool and heat a room in a building and the like by performing a vapor compression-type refrigeration cycle operation. The air conditioner 1 mainly includes one outdoor unit 2 as a heat source unit, indoor units 4 and 5 as a plurality (two in the present embodiment) of utilization units connected in parallel thereto, and a liquid refrigerant communication pipe 6 and a gas refrigerant communication pipe 7 as refrigerant communication pipes which interconnect the outdoor unit 2 and the indoor units 4 and 5. In other words, the vapor compression-type refrigerant circuit 10 of the air conditioner 1 in the present embodiment is configured by the interconnection of the outdoor unit 2, the indoor units 4 and 5, and the liquid refrigerant communication pipe 6 and the gas refrigerant communication pipe 7.

<Indoor Unit>

The indoor units 4 and 5 are installed by being embedded in or hung from a ceiling of a room in a building and the like or by being mounted or the like on a wall surface of a room. The indoor units 4 and 5 are connected to the outdoor unit 2 via the liquid refrigerant communication pipe 6 and the gas refrigerant communication pipe 7, and configure a part of the refrigerant circuit 10.

Next, the configurations of the indoor units 4 and 5 are described. Note that, because the indoor units 4 and 5 have the same configuration, only the configuration of the indoor unit 4 is described here, and in regard to the configuration of the indoor unit 5, reference numerals in the 50s are used instead of reference numerals in the 40s representing the respective portions of the indoor unit 4, and description of those respective portions are omitted.

The indoor unit 4 mainly includes an indoor side refrigerant circuit 10a (an indoor side refrigerant circuit 10b in the case of the indoor unit 5) that configures a part of the refrigerant circuit 10. The indoor side refrigerant circuit 10a mainly includes an indoor expansion valve 41 as an expansion mechanism and an indoor heat exchanger 42 as a utilization side heat exchanger.

In the present embodiment, the indoor expansion valve 41 is an electrically powered expansion valve connected to a liquid side of the indoor heat exchanger 42 in order to adjust the flow rate or the like of the refrigerant flowing in the indoor side refrigerant circuit 10a.

In the present embodiment, the indoor heat exchanger 42 is a cross fin-type fin-and-tube type heat exchanger configured by a heat transfer tube and numerous fins, and is a heat exchanger that functions as an evaporator for the refrigerant during a cooling operation to cool the room air and functions as a condenser for the refrigerant during a heating operation to heat the room air.

In the present embodiment, the indoor unit 4 includes an indoor fan 43 as a ventilation fan for taking in room air into the unit, causing the air to heat exchange with the refrigerant in the indoor heat exchanger 42, and then supplying the air to the room as supply air. The indoor fan 43 is a fan capable of varying an air flow rate Wr of the air which is supplied to the indoor heat exchanger 42, and in the present embodiment, is a centrifugal fan, multi-blade fan, or the like, which is driven by a motor 43a comprising a DC fan motor.

In addition, various types of sensors are disposed in the indoor unit 4. A liquid side temperature sensor 44 that detects the temperature of the refrigerant (i.e., the refrigerant temperature corresponding to a condensation temperature Tc during the heating operation or an evaporation temperature Te during the cooling operation) is disposed at the liquid side of the indoor heat exchanger 42. A gas side temperature sensor 45 that detects a temperature Teo of the refrigerant is disposed at a gas side of the indoor heat exchanger 42. A room temperature sensor 46 that detects the temperature of the room air that flows into the unit (i.e., a room temperature Tr) is disposed at a room air intake side of the indoor unit 4. In the present embodiment, the liquid side temperature sensor 44, the gas side temperature sensor 45, and the room temperature sensor 46 comprise thermistors. In addition, the indoor unit 4 includes an indoor side controller 47 that controls the operation of each portion constituting the indoor unit 4. Additionally, the indoor side controller 47 includes a microcomputer and a memory and the like disposed in order to control the indoor unit 4, and is configured such that it can exchange control signals and the like with a remote controller (not shown) for individually operating the indoor unit 4 and can exchange control signals and the like with the outdoor unit 2 via a transmission line 8a.

<Outdoor Unit>

The outdoor unit 2 is installed outside of a building and the like, is connected to the indoor units 4 and 5 via the liquid refrigerant communication pipe 6 and the gas refrigerant communication pipe 7, and configures the refrigerant circuit 10 with the indoor units 4 and 5.

Next, the configuration of the outdoor unit 2 is described. The outdoor unit 2 mainly includes an outdoor side refrigerant circuit 10c that configures a part of the refrigerant circuit 10. This outdoor side refrigerant circuit 10c mainly includes a compressor 21, a four-way switching valve 22, an outdoor heat exchanger 23 as a heat source side heat exchanger, an outdoor expansion valve 38 as an expansion mechanism, an accumulator 24, a subcooler 25 as a temperature adjustment mechanism, a liquid side stop valve 26, and a gas side stop valve 27.

The compressor 21 is a compressor whose operation capacity can be varied, and in the present embodiment, is a positive displacement-type compressor driven by a motor 21a whose rotation frequency Rm is controlled by an inverter. In the present embodiment, only one compressor 21 is provided, but it is not limited thereto, and two or more compressors may be connected in parallel according to the number of connected units of indoor units and the like.

The four-way switching valve 22 is a valve for switching the direction of the flow of the refrigerant such that, during the cooling operation, the four-way switching valve 22 is capable of connecting a discharge side of the compressor 21 and a gas side of the outdoor heat exchanger 23 and connecting a suction side of the compressor 21 (specifically, the accumulator 24) and the gas refrigerant communication pipe 7 (see the solid lines of the four-way switching valve 22 in FIG. 1) to cause the outdoor heat exchanger 23 to function as a condenser for the refrigerant compressed in the compressor 21 and to cause the indoor heat exchangers 42 and 52 to function as evaporators for the refrigerant condensed in the outdoor heat exchanger 23; and such that, during the heating operation, the four-way switching valve 22 is capable of connecting the discharge side of the compressor 21 and the gas refrigerant communication pipe 7 and connecting the suction side of the compressor 21 and the gas side of the outdoor heat exchanger 23 (see the dotted lines of the four-way switching valve 22 in FIG. 1) to cause the indoor heat exchangers 42 and 52 to function as condensers for the refrigerant compressed in the compressor 21 and to cause the outdoor heat exchanger 23 to function as an evaporator for the refrigerant condensed in the indoor heat exchangers 42 and 52.

In the present embodiment, the outdoor heat exchanger 23 is a cross-fin type fin-and-tube type heat exchanger configured by a heat transfer tube and numerous fins, and is a heat exchanger that functions as a condenser for the refrigerant during the cooling operation and as an evaporator for the refrigerant during the heating operation. The gas side of the outdoor heat exchanger 23 is connected to the four-way switching valve 22, and the liquid side thereof is connected to the liquid refrigerant communication pipe 6.

In the present embodiment, the outdoor expansion valve 38 is an electrically powered expansion valve connected to a liquid side of the outdoor heat exchanger 23 in order to adjust the pressure, flow rate, or the like of the refrigerant flowing in the outdoor side refrigerant circuit 10c.

In the present embodiment, the outdoor unit 2 includes an outdoor fan 28 as a ventilation fan for taking in outdoor air into the unit, causing the air to exchange heat with the refrigerant in the outdoor heat exchanger 23, and then exhausting the air to the outside. The outdoor fan 28 is a fan capable of varying an air flow rate Wo of the air which is supplied to the outdoor heat exchanger 23, and in the present embodiment, is a propeller fan or the like driven by a motor 28a comprising a DC fan motor.

The accumulator 24 is connected between the four-way switching valve 22 and the compressor 21, and is a container capable of accumulating excess refrigerant generated in the refrigerant circuit 10 in accordance with the change in the operation load of the indoor units 4 and 5 and the like.

In the present embodiment, the subcooler 25 is a double tube heat exchanger, and is disposed to cool the refrigerant sent to the indoor expansion valves 41 and 51 after the refrigerant is condensed in the outdoor heat exchanger 23. In the present embodiment, the subcooler 25 is connected between the outdoor expansion valve 38 and the liquid side stop valve 26.

In the present embodiment, a bypass refrigerant circuit 61 as a cooling source of the subcooler 25 is disposed. Note that, in the description below, a portion corresponding to the refrigerant circuit 10 excluding the bypass refrigerant circuit 61 is referred to as a main refrigerant circuit for convenience sake.

The bypass refrigerant circuit 61 is connected to the main refrigerant circuit so as to cause a portion of the refrigerant sent from the outdoor heat exchanger 23 to the indoor expansion valves 41 and 51 to branch from the main refrigerant circuit and return to the suction side of the compressor 21. Specifically, the bypass refrigerant circuit 61 includes a branch circuit 61a connected so as to branch a portion of the refrigerant sent from the outdoor expansion valve 38 to the indoor expansion valves 41 and 51 at a position between the outdoor heat exchanger 23 and the subcooler 25, and a merging circuit 61b connected to the suction side of the compressor 21 so as to return a portion of refrigerant from an outlet on a bypass refrigerant circuit side of the subcooler 25 to the suction side of the compressor 21. Further, the branch circuit 61a is disposed with a bypass expansion valve 62 for adjusting the flow rate of the refrigerant flowing in the bypass refrigerant circuit 61. Here, the bypass expansion valve 62 comprises an electrically operated expansion valve. In this way, the refrigerant sent from the outdoor heat exchanger 23 to the indoor expansion valves 41 and 51 is cooled in the subcooler 25 by the refrigerant flowing in the bypass refrigerant circuit 61 which has been depressurized by the bypass expansion valve 62. In other words, performance of the subcooler 25 is controlled by adjusting the opening degree of the bypass expansion valve 62.

The liquid side stop valve 26 and the gas side stop valve 27 are valves disposed at ports connected to external equipment and pipes (specifically, the liquid refrigerant communication pipe 6 and the gas refrigerant communication pipe 7). The liquid side stop valve 26 is connected to the outdoor heat exchanger 23. The gas side stop valve 27 is connected to the four-way switching valve 22.

In addition, various sensors are disposed in the outdoor unit 2. Specifically, disposed in the outdoor unit 2 are an suction pressure sensor 29 that detects a suction pressure Ps of the compressor 21, a discharge pressure sensor 30 that detects a discharge pressure Pd of the compressor 21, a suction temperature sensor 31 that detects a suction temperature Ts of the compressor 21, and a discharge temperature sensor 32 that detects a discharge temperature Td of the compressor 21. The suction temperature sensor 31 is disposed at a position between the accumulator 24 and the compressor 21. A heat exchanger temperature sensor 33 that detects the temperature of the refrigerant flowing through the outdoor heat exchanger 23 (i.e., the refrigerant temperature corresponding to the condensation temperature Tc during the cooling operation or the evaporation temperature Te during the heating operation) is disposed in the outdoor heat exchanger 23. A liquid side temperature sensor 34 that detects a refrigerant temperature Tco is disposed at the liquid side of the outdoor heat exchanger 23. A liquid pipe temperature sensor 35 that detects the temperature of the refrigerant (i.e., a liquid pipe temperature Tlp) is disposed at the outlet on the main refrigerant circuit side of the subcooler 25. The merging circuit 61b of the bypass refrigerant circuit 61 is disposed with a bypass temperature sensor 63 for detecting the temperature of the refrigerant flowing through the outlet on the bypass refrigerant circuit side of the subcooler 25. An outdoor temperature sensor 36 that detects the temperature of the outdoor air that flows into the unit (i.e., an outdoor temperature Ta) is disposed at an outdoor air intake side of the outdoor unit 2. In the present embodiment, the suction temperature sensor 31, the discharge temperature sensor 32, the heat exchanger temperature sensor 33, the liquid side temperature sensor 34, the liquid pipe temperature sensor 35, the outdoor temperature sensor 36, and the bypass temperature sensor 63 comprise thermistors. In addition, the outdoor unit 2 includes an outdoor side controller 37 that controls the operation of each portion constituting the outdoor unit 2. Additionally, the outdoor side controller 37 includes a microcomputer and a memory disposed in order to control the outdoor unit 2, an inverter circuit that controls the motor 21a, and the like, and is configured such that it can exchange control signals and the like with the indoor side controllers 47 and 57 of the indoor units 4 and 5 via the transmission line 8a. In other words, a controller 8 that performs the operation control of the entire air conditioner 1 is configured by the indoor side controllers 47 and 57, the outdoor side controller 37, and the transmission line 8a that interconnects the controllers 37, 47, and 57.

Figure 2:
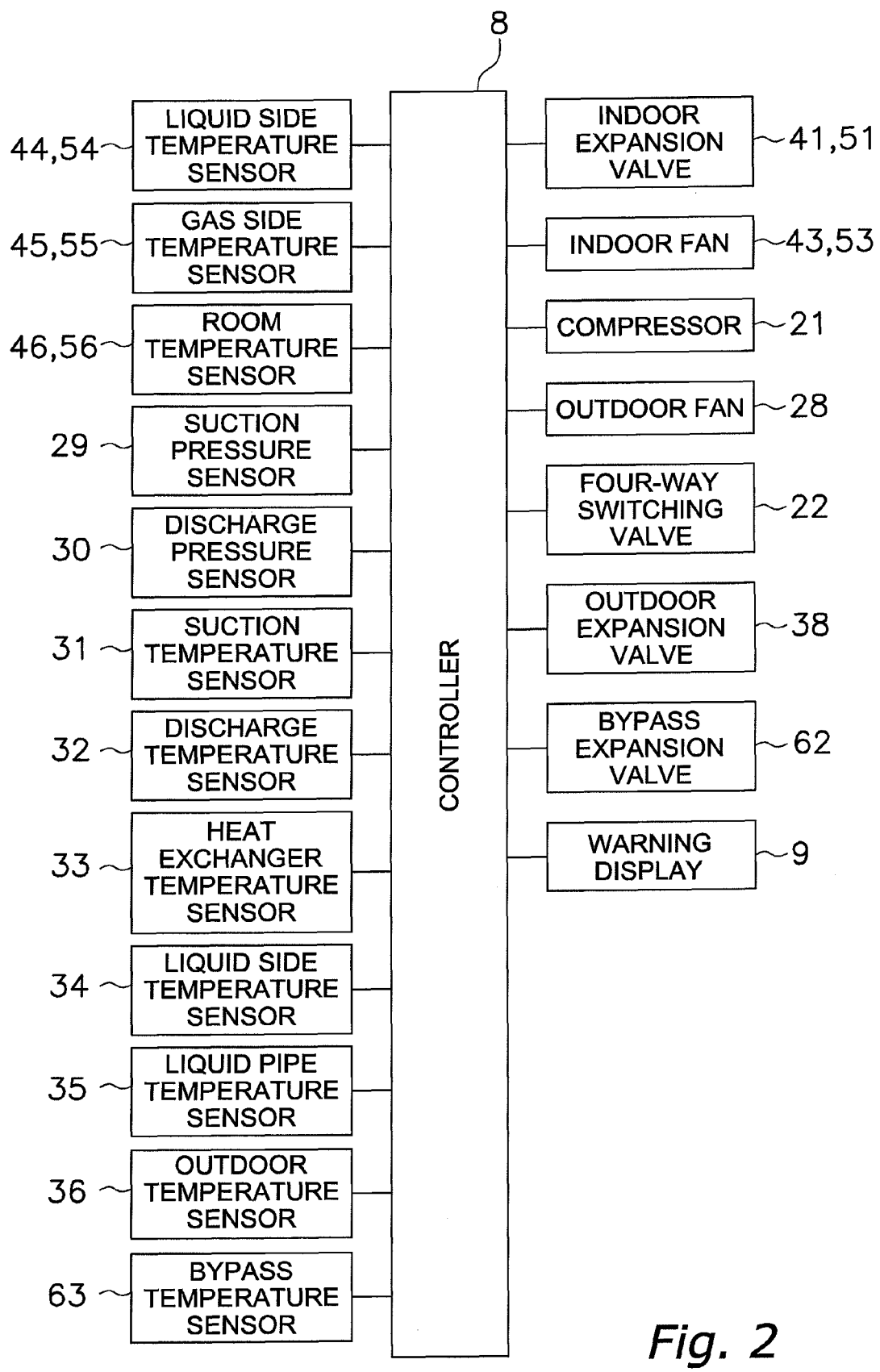
FIG. 2 is a control block diagram of the air conditioner.

As shown in FIG. 2, the controller 8 is connected so as to be able to receive detection signals of sensors 29 to 36, 44 to 46, 54 to 56, and 63 and also to be able to control various equipment and valves 21, 22, 24, 28a, 38, 41, 43a, 51, 53a, and 62 based on these detection signals and the like. In addition, a warning display 9 comprising LEDs and the like, which is configured to indicate that a refrigerant leak is detected in the below described refrigerant leak detection operation, is connected to the controller 8. Here, FIG. 2 is a control block diagram of the air conditioner 1.

<Refrigerant Communication Pipe>

The refrigerant communication pipes 6 and 7 are refrigerant pipes that are arranged on site when installing the air conditioner 1 at an installation location such as a building. As the refrigerant communication pipes 6 and 7, pipes having various lengths and pipe diameters are used according to the installation conditions such as an installation location, combination of an outdoor unit and an indoor unit, and the like. Accordingly, for example, when installing a new air conditioner, in order to calculate the charging quantity of the refrigerant, it is necessary to obtain accurate information regarding the lengths and pipe diameters and the like of the refrigerant communication pipes 6 and 7. However, management of such information and the calculation itself of the refrigerant quantity are difficult. In addition, when utilizing an existing pipe to renew an indoor unit and an outdoor unit, information regarding the lengths and pipe diameters and the like of the refrigerant communication pipes 6 and 7 may have been lost in some cases.

As described above, the refrigerant circuit 10 of the air conditioner 1 is configured by the interconnection of the indoor side refrigerant circuits 10a and 10b, the outdoor side refrigerant circuit 10c, and the refrigerant communication pipes 6 and 7. In addition, it can also be said that this refrigerant circuit 10 is configured by the bypass refrigerant circuit 61 and the main refrigerant circuit excluding the bypass refrigerant circuit 61. Additionally, the controller 8 constituted by the indoor side controllers 47 and 57 and the outdoor side controller 37 allows the air conditioner 1 in the present embodiment to switch and operate between the cooling operation and the heating operation by the four-way switching valve 22 and to control each equipment of the outdoor unit 2 and the indoor units 4 and 5 according to the operation load of each of the indoor units 4 and 5.

(2) Operation of the Air Conditioner

Next, the operation of the air conditioner 1 in the present embodiment is described.

The operation modes of the air conditioner 1 in the present embodiment include: a normal operation mode where control of constituent equipment of the outdoor unit 2 and the indoor units 4 and 5 is performed according to the operation load of each of the indoor units 4 and 5; a test operation mode where a test operation to be performed after installation of constituent equipment of the air conditioner 1 is performed (specifically, it is not limited to after the first installation of equipment: it also includes, for example, after modification by adding or removing constituent equipment such as an indoor unit, after repair of damaged equipment); and a refrigerant leak detection operation mode where, after the test operation is finished and the normal operation has started, whether or not the refrigerant is leaking from the refrigerant circuit 10 is judged. The normal operation mode mainly includes the cooling operation for cooling the room and the heating operation for heating the room. In addition, the test operation mode mainly includes an automatic refrigerant charging operation to charge refrigerant into the refrigerant circuit 10; a pipe volume judging operation to detect the volumes of the refrigerant communication pipes 6 and 7; and an initial refrigerant quantity detection operation to detect the initial refrigerant quantity after installing constituent equipment or after charging refrigerant into the refrigerant circuit.

Operation in each operation mode of the air conditioner 1 is described below.

<Normal Operation Mode>

(Cooling Operation)

First, the cooling operation in the normal operation mode is described with reference to FIGS. 1 and 2.

During the cooling operation, the four-way switching valve 22 is in the state represented by the solid lines in FIG. 1, i.e., a state where the discharge side of the compressor 21 is connected to the gas side of the outdoor heat exchanger 23 and also the suction side of the compressor 21 is connected to the gas sides of the indoor heat exchangers 42 and 52 via the gas side stop valve 27 and the gas refrigerant communication pipe 7. The outdoor expansion valve 38 is in a fully opened state. The liquid side stop valve 26 and the gas side stop valve 27 are in an opened state. The opening degree of each of the indoor expansion valves 41 and 51 is adjusted such that a superheat degree SHr of the refrigerant at the outlets of the indoor heat exchangers 42 and 52 (i.e., the gas sides of the indoor heat exchangers 42 and 52) becomes constant at a target superheat degree SHrs. In the present embodiment, the superheat degree SHr of the refrigerant at the outlet of each of the indoor heat exchangers 42 and 52 is detected by subtracting the refrigerant temperature (which corresponds to the evaporation temperature Te) detected by the liquid side temperature sensors 44 and 54 from the refrigerant temperature detected by the gas side temperature sensors 45 and 55, or is detected by converting the suction pressure Ps of the compressor 21 detected by the suction pressure sensor 29 to saturated temperature corresponding to the evaporation temperature Te, and subtracting this saturated temperature of the refrigerant from the refrigerant temperature detected by the gas side temperature sensors 45 and 55. Note that, although it is not employed in the present embodiment, a temperature sensor that detects the temperature of the refrigerant flowing through each of the indoor heat exchangers 42 and 52 may be disposed such that the superheat degree SHr of the refrigerant at the outlet of each of the indoor heat exchangers 42 and 52 is detected by subtracting the refrigerant temperature corresponding to the evaporation temperature Te which is detected by this temperature sensor from the refrigerant temperature detected by the gas side temperature sensors 45 and 55. In addition, the opening degree of the bypass expansion valve 62 is adjusted such that a superheat degree SHb of the refrigerant at the outlet on the bypass refrigerant circuit side of the subcooler 25 becomes a target superheat degree SHbs. In the present embodiment, the superheat degree SHb of the refrigerant at the outlet on the bypass refrigerant circuit side of the subcooler 25 is detected by converting the suction pressure Ps of the compressor 21 detected by the suction pressure sensor 29 to saturated temperature corresponding to the evaporation temperature Te, and subtracting this saturated temperature of the refrigerant from the refrigerant temperature detected by the bypass temperature sensor 63. Note that, although it is not employed in the present embodiment, a temperature sensor may be disposed at an inlet on the bypass refrigerant circuit side of the subcooler 25 such that the superheat degree SHb of the refrigerant at the outlet on the bypass refrigerant circuit side of the subcooler 25 is detected by subtracting the refrigerant temperature detected by this temperature sensor from the refrigerant temperature detected by the bypass temperature sensor 63.

When the compressor 21, the outdoor fan 28, the indoor fans 43 and 53 are started in this state of the refrigerant circuit 10, low-pressure gas refrigerant is sucked into the compressor 21 and compressed into high-pressure gas refrigerant. Subsequently, the high-pressure gas refrigerant is sent to the outdoor heat exchanger 23 via the four-way switching valve 22, exchanges heat with the outdoor air supplied by the outdoor fan 28, and becomes condensed into high-pressure liquid refrigerant. Then, this high-pressure liquid refrigerant passes through the outdoor expansion valve 38, flows into the subcooler 25, exchanges heat with the refrigerant flowing in the bypass refrigerant circuit 61, is further cooled, and becomes subcooled. At this time, a portion of the high-pressure liquid refrigerant condensed in the outdoor heat exchanger 23 is branched into the bypass refrigerant circuit 61 and is depressurized by the bypass expansion valve 62. Subsequently, it is returned to the suction side of the compressor 21. Here, the refrigerant that passes through the bypass expansion valve 62 is depressurized close to the suction pressure Ps of the compressor 21 and thereby a portion of the refrigerant evaporates. Then, the refrigerant flowing from the outlet of the bypass expansion valve 62 of the bypass refrigerant circuit 61 toward the suction side of the compressor 21 passes through the subcooler 25 and exchanges heat with high-pressure liquid refrigerant sent from the outdoor heat exchanger 23 on the main refrigerant circuit side to the indoor units 4 and 5.

Then, the high-pressure liquid refrigerant that has become subcooled is sent to the indoor units 4 and 5 via the liquid side stop valve 26 and the liquid refrigerant communication pipe 6. The high-pressure liquid refrigerant sent to the indoor units 4 and 5 is depressurized close to the suction pressure Ps of the compressor 21 by the indoor expansion valves 41 and 51, becomes refrigerant in a low-pressure gas-liquid two-phase state, is sent to the indoor heat exchangers 42 and 52, exchanges heat with the room air in the indoor heat exchangers 42 and 52, and is evaporated into low-pressure gas refrigerant.

This low-pressure gas refrigerant is sent to the outdoor unit 2 via the gas refrigerant communication pipe 7, and flows into the accumulator 24 via the gas side stop valve 27 and the four-way switching valve 22. Then, the low-pressure gas refrigerant that flowed into the accumulator 24 is again sucked into the compressor 21.

(Heating Operation)

Next, the heating operation in the normal operation mode is described.

During the heating operation, the four-way switching valve 22 is in a state represented by the dotted lines in FIG. 1, i.e., a state where the discharge side of the compressor 21 is connected to the gas sides of the indoor heat exchangers 42 and 52 via the gas side stop valve 27 and the gas refrigerant communication pipe 7 and also the suction side of the compressor 21 is connected to the gas side of the outdoor heat exchanger 23. The opening degree of the outdoor expansion valve 38 is adjusted so as to be able to depressurize the refrigerant that flows into the outdoor heat exchanger 23 to a pressure where the refrigerant can evaporate (i.e., evaporation pressure Pe) in the outdoor heat exchanger 23. In addition, the liquid side stop valve 26 and the gas side stop valve 27 are in an opened state. The opening degree of the indoor expansion valves 41 and 51 is adjusted such that a subcooling degree SCr of the refrigerant at the outlets of the indoor heat exchangers 42 and 52 becomes constant at the target subcooling degree SCrs. In the present embodiment, a subcooling degree SCr of the refrigerant at the outlets of the indoor heat exchangers 42 and 52 is detected by converting the discharge pressure Pd of the compressor 21 detected by the discharge pressure sensor 30 to saturated temperature corresponding to the condensation temperature Tc, and subtracting the refrigerant temperature detected by the liquid side temperature sensors 44 and 54 from this saturated temperature of the refrigerant. Note that, although it is not employed in the present embodiment, a temperature sensor that detects the temperature of the refrigerant flowing through each of the indoor heat exchangers 42 and 52 may be disposed such that the subcooling degree SCr of the refrigerant at the outlets of the indoor heat exchangers 42 and 52 is detected by subtracting the refrigerant temperature corresponding to the condensation temperature Tc which is detected by this temperature sensor from the refrigerant temperature detected by the liquid side temperature sensors 44 and 54. In addition, the bypass expansion valve 62 is closed.

When the compressor 21, the outdoor fan 28, the indoor fans 43 and 53 are started in this state of the refrigerant circuit 10, low-pressure gas refrigerant is sucked into the compressor 21, compressed into high-pressure gas refrigerant, and sent to the indoor units 4 and 5 via the four-way switching valve 22, the gas side stop valve 27, and the gas refrigerant communication pipe 7.

Then, the high-pressure gas refrigerant sent to the indoor units 4 and 5 exchanges heat with the room air in the indoor heat exchangers 42 and 52 and is condensed into high-pressure liquid refrigerant. Subsequently, it is depressurized according to the opening degree of the indoor expansion valves 41 and 51 when passing through the indoor expansion valves 41 and 51.

The refrigerant that passed through the indoor expansion valves 41 and 51 is sent to the outdoor unit 2 via the liquid refrigerant communication pipe 6, is further depressurized via the liquid side stop valve 26, the subcooler 25, and the outdoor expansion valve 38, and then flows into the outdoor heat exchanger 23. Then, the refrigerant in a low-pressure gas-liquid two-phase state that flowed into the outdoor heat exchanger 23 exchanges heat with the outdoor air supplied by the outdoor fan 28, is evaporated into low-pressure gas refrigerant, and flows into the accumulator 24 via the four-way switching valve 22. Then, the low-pressure gas refrigerant that flowed into the accumulator 24 is again sucked into the compressor 21.

Such operation control as described above in the normal operation mode is performed by the controller 8 (more specifically, the indoor side controllers 47 and 57, the outdoor side controller 37, and the transmission line 8a that connects between the controllers 37, 47 and 57) that functions as normal operation controlling means to perform the normal operation that includes the cooling operation and the heating operation.

<Test Operation Mode>

Figure 3:
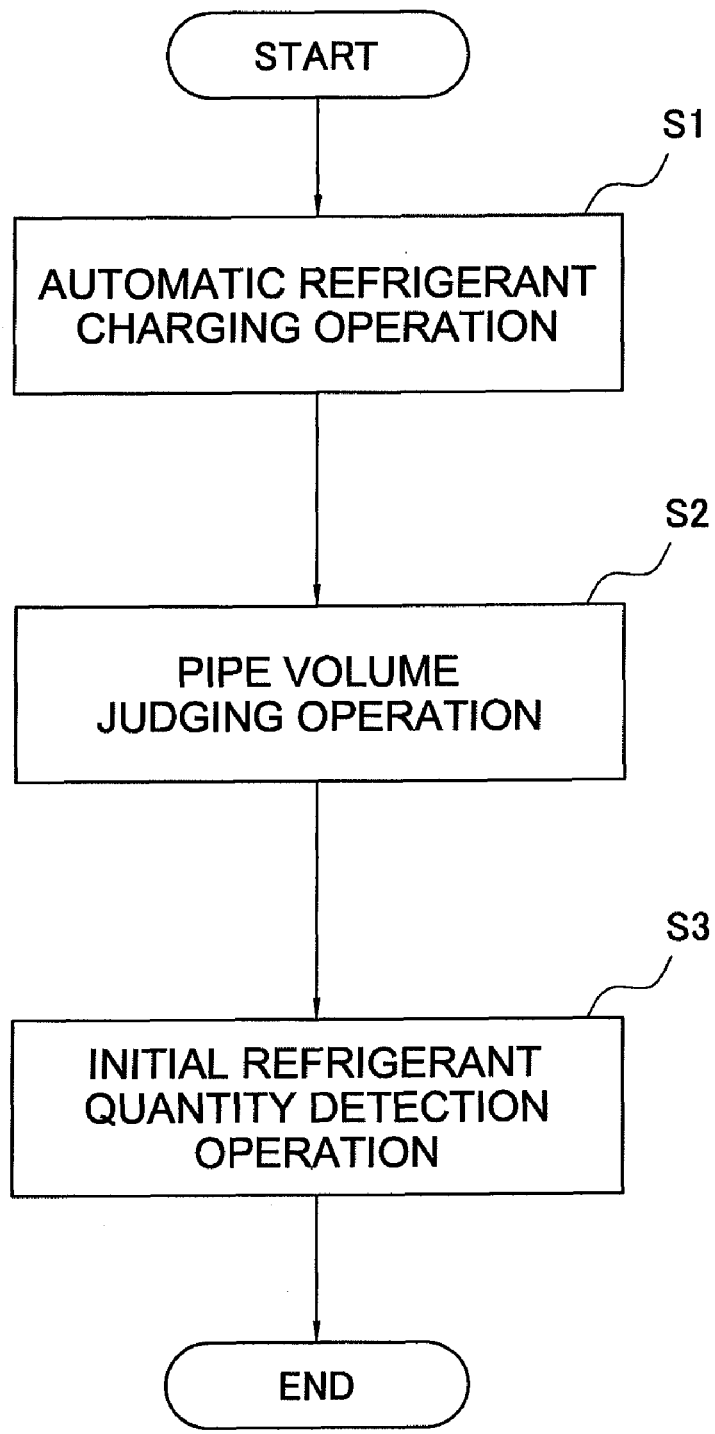
FIG. 3 is a flowchart of a test operation mode.

Next, the test operation mode is described with reference to FIGS. 1 to 3. Here, FIG. 3 is a flowchart of the test operation mode. In the present embodiment, in the test operation mode, first, the automatic refrigerant charging operation in Step S1 is performed. Subsequently, the pipe volume judging operation in Step S2 is performed, and then the initial refrigerant quantity detection operation in Step S3 is performed.

In the present embodiment, an example of a case is described where, the outdoor unit 2 in which the refrigerant is charged in advance and the indoor units 4 and 5 are installed at an installation location such as a building, and the outdoor unit 2, the indoor units 4, 5 are interconnected via the liquid refrigerant communication pipe 6 and the gas refrigerant communication pipe 7 to configure the refrigerant circuit 10, and subsequently additional refrigerant is charged into the refrigerant circuit 10 whose refrigerant quantity is insufficient according to the volumes of the liquid refrigerant communication pipe 6 and the gas refrigerant communication pipe 7.

(Step S1: Automatic Refrigerant Charging Operation)

First, the liquid side stop valve 26 and the gas side stop valve 27 of the outdoor unit 2 are opened and the refrigerant circuit 10 is filled with the refrigerant that is charged in the outdoor unit 2 in advance.

Figure 4:
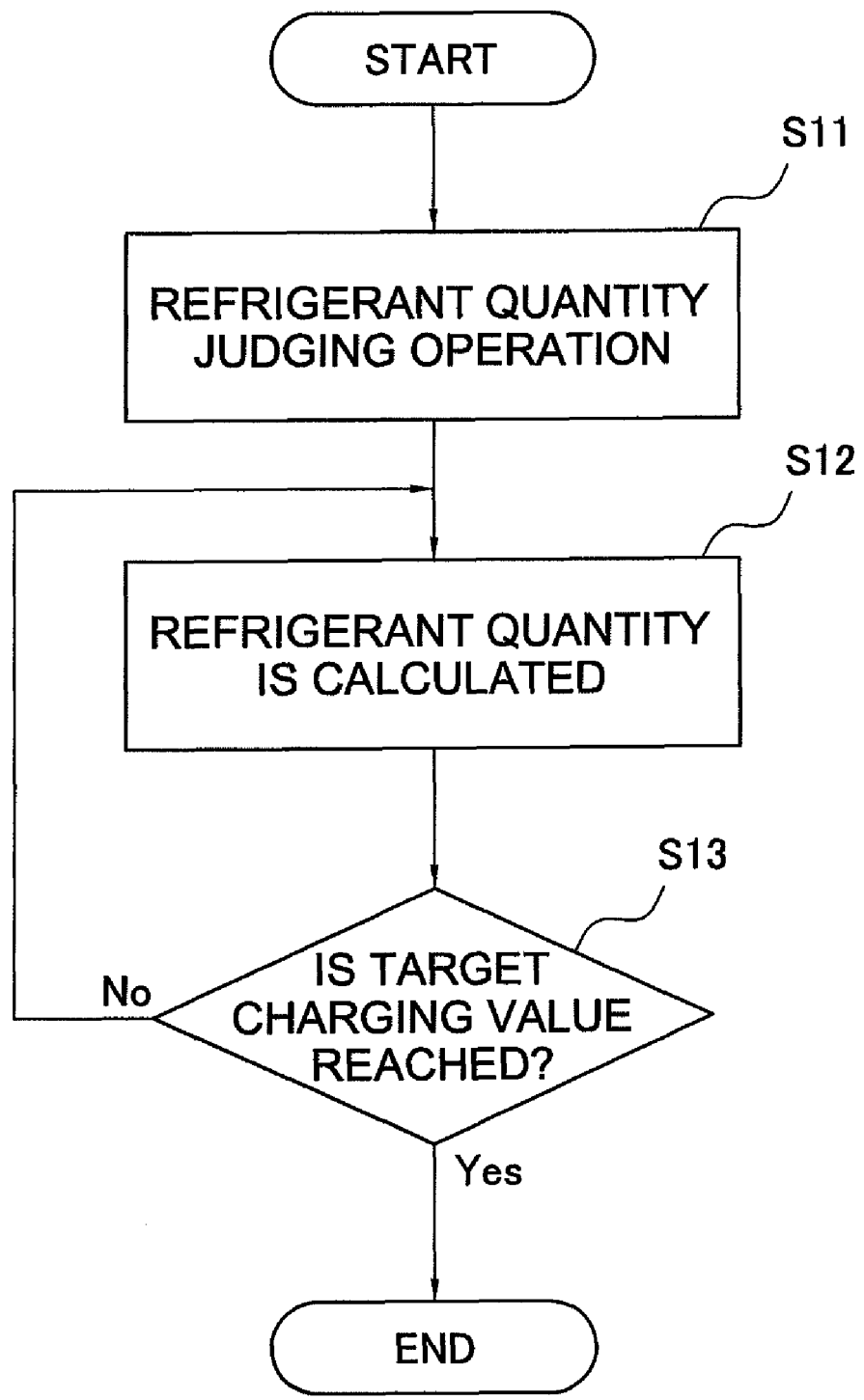
FIG. 4 is a flowchart of an automatic refrigerant charging operation.

Next, when a worker performing the test operation connects a refrigerant cylinder for additional charging to a service port (not shown) of the refrigerant circuit 10 and issues a command to start the test operation directly to the controller 8 or remotely by a remote controller (not shown) and the like, the controller 8 starts the process from Step S11 to Step S13 shown in FIG. 4. Here, FIG. 4 is a flowchart of the automatic refrigerant charging operation.

(Step S11: Refrigerant Quantity Judging Operation)

When a command to start the automatic refrigerant charging operation is issued, the refrigerant circuit 10, with the four-way switching valve 22 of the outdoor unit 2 in the state represented by the solid lines in FIG. 1, becomes a state where the indoor expansion valves 41 and 51 of the indoor units 4 and 5 and the outdoor expansion valve 38 are opened. Then, the compressor 21, the outdoor fan 28, and the indoor fans 43 and 53 are started, and the cooling operation is forcibly performed in all of the indoor units 4 and 5 (hereinafter referred to as "all indoor unit operation").

Figure 5:
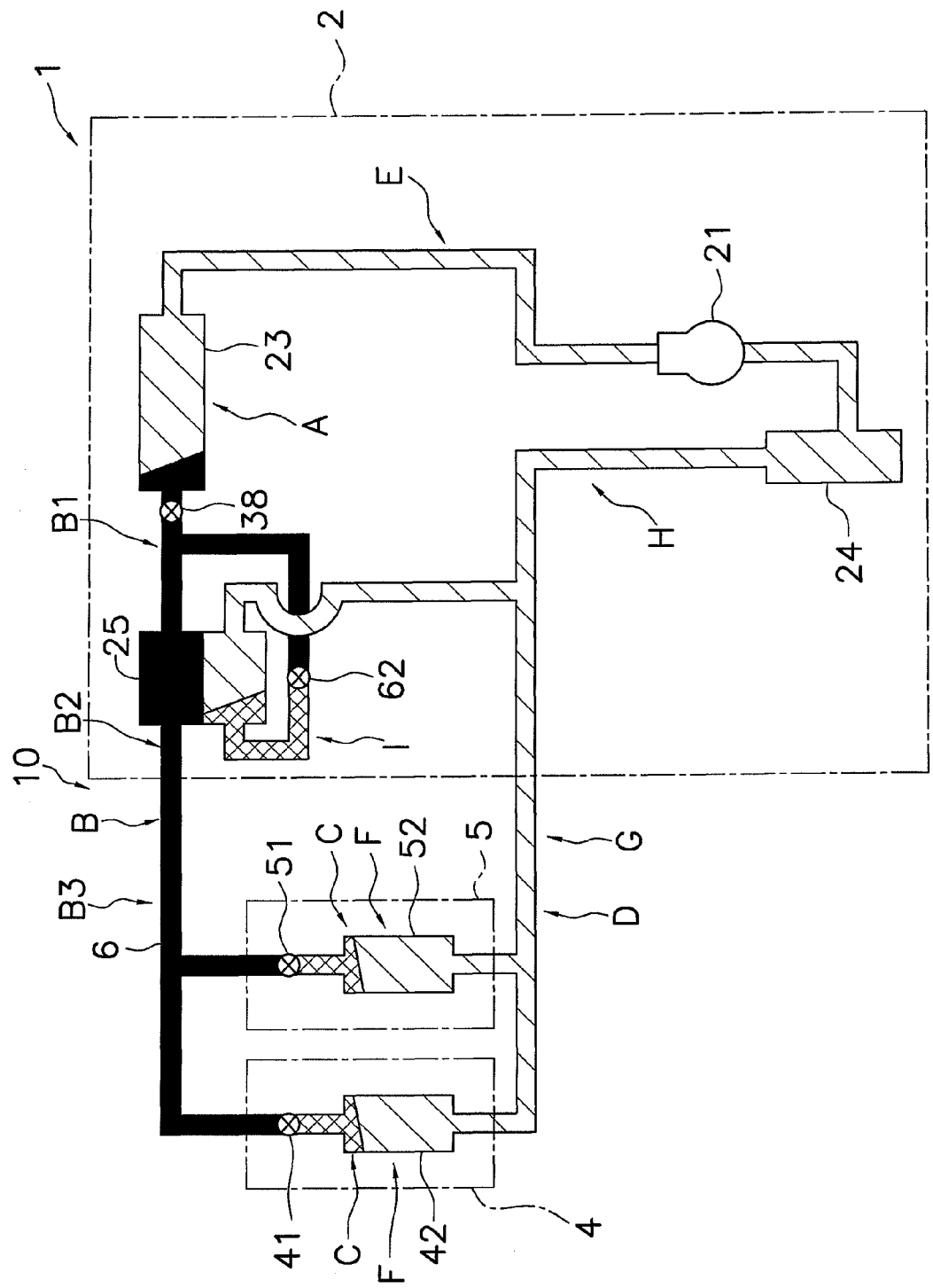
FIG. 5 is a schematic diagram to show a state of refrigerant flowing in a refrigerant circuit in a refrigerant quantity judging operation (illustrations of a four-way switching valve and the like are omitted).

Consequently, as shown in FIG. 5, in the refrigerant circuit 10, the high-pressure gas refrigerant compressed and discharged in the compressor 21 flows along a flow path from the compressor 21 to the outdoor heat exchanger 23 that functions as a condenser (see the portion from the compressor 21 to the outdoor heat exchanger 23 in the hatching area indicated by the diagonal line in FIG. 5); the high-pressure refrigerant that undergoes phase-change from a gas state to a liquid state by heat exchange with the outdoor air flows in the outdoor heat exchanger 23 that functions as a condenser (see the portion corresponding to the outdoor heat exchanger 23 in the hatching area indicated by the diagonal line and the black-lacquered hatching area in FIG. 5); the high-pressure liquid refrigerant flows along a flow path from the outdoor heat exchanger 23 to the indoor expansion valves 41 and 51 including the outdoor expansion valve 38, the portion corresponding to the main refrigerant circuit side of the subcooler 25 and the liquid refrigerant communication pipe 6, and a flow path from the outdoor heat exchanger 23 to the bypass expansion valve 62 (see the portions from the outdoor heat exchanger 23 to the indoor expansion valves 41 and 51 and to the bypass expansion valve 62 in the area indicated by the black hatching in FIG. 5); the low-pressure refrigerant that undergoes phase-change from a gas-liquid two-phase state to a gas state by heat exchange with the room air flows in the portions corresponding to the indoor heat exchangers 42 and 52 that function as evaporators and the portion corresponding to the bypass refrigerant circuit side of the subcooler 25 (see the portions corresponding to the indoor heat exchangers 42 and 52 and the portion corresponding to the subcooler 25 in the area indicated by the lattice hatching and the hatching indicated by the diagonal line in FIG. 5); and the low-pressure gas refrigerant flows along a flow path from the indoor heat exchangers 42 and 52 to the compressor 21 including the gas refrigerant communication pipe 7 and the accumulator 24 and a flow path from the portion corresponding to the bypass refrigerant circuit side of the subcooler 25 to the compressor 21 (see the portion from the indoor heat exchangers 42 and 52 to the compressor 21 and the portion from the portion corresponding to the bypass refrigerant circuit side of the subcooler 25 to the compressor 21 in the hatching area indicated by the diagonal line in FIG. 5). FIG. 5 is a schematic diagram to show a state of the refrigerant flowing in the refrigerant circuit 10 in a refrigerant quantity judging operation (illustrations of the four-way switching valve 22 and the like are omitted).

Next, equipment control as described below is performed to proceed to operation to stabilize the state of the refrigerant circulating in the refrigerant circuit 10. Specifically, the indoor expansion valves 41 and 51 are controlled such that the superheat degree SHr of the indoor heat exchangers 42 and 52 that function as evaporators becomes constant (hereinafter referred to as "super heat degree control"); the operation capacity of the compressor 21 is controlled such that an evaporation pressure Pe becomes constant (hereinafter referred to as "evaporation pressure control"); the air flow rate Wo of outdoor air supplied to the outdoor heat exchanger 23 by the outdoor fan 28 is controlled such that a condensation pressure Pc of the refrigerant in the outdoor heat exchanger 23 becomes constant (hereinafter referred to as "condensation pressure control"); the operation capacity of the subcooler 25 is controlled such that the temperature of the refrigerant sent from the subcooler 25 to the indoor expansion valves 41 and 51 becomes constant (hereinafter referred to as "liquid pipe temperature control"); and the air flow rate Wr of room air supplied to the indoor heat exchangers 42 and 52 by the indoor fans 43 and 53 is maintained constant such that the evaporation pressure Pe of the refrigerant is stably controlled by the above described evaporation pressure control.

Here, the reason to perform the evaporation pressure control is that the evaporation pressure Pe of the refrigerant in the indoor heat exchangers 42 and 52 that function as evaporators is greatly affected by the refrigerant quantity in the indoor heat exchangers 42 and 52 where low-pressure refrigerant flows while undergoing a phase change from a gas-liquid two-phase state to a gas state as a result of heat exchange with the room air (see the portions corresponding to the indoor heat exchangers 42 and 52 in the area indicated by the lattice hatching and hatching indicated by the diagonal line in FIG. 5, which is hereinafter referred to as "evaporator portion C"). Consequently, here, a state is created in which the refrigerant quantity in the evaporator portion C changes mainly by the evaporation pressure Pe by causing the evaporation pressure Pe of the refrigerant in the indoor heat exchangers 42 and 52 to become constant and by stabilizing the state of the refrigerant flowing in the evaporator portion C as a result of controlling the operation capacity of the compressor 21 by the motor 21a whose rotation frequency Rm is controlled by an inverter. Note that, the control of the evaporation pressure Pe by the compressor 21 in the present embodiment is achieved in the following manner: the refrigerant temperature (which corresponds to the evaporation temperature Te) detected by the liquid side temperature sensors 44 and 54 of the indoor heat exchangers 42 and 52 is converted to saturation pressure; the operation capacity of the compressor 21 is controlled such that the saturation pressure becomes constant at a target low pressure Pes (in other words, the control to change the rotation frequency Rm of the motor 21a is performed); and then a refrigerant circulation flow rate Wc flowing in the refrigerant circuit 10 is increased or decreased. Note that, although it is not employed in the present embodiment, the operation capacity of the compressor 21 may be controlled such that the suction pressure Ps of the compressor 21 detected by the suction pressure sensor 29, which is the operation state quantity equivalent to the pressure of the refrigerant at the evaporation pressure Pe of the refrigerant in the indoor heat exchangers 42 and 52, becomes constant at the target low pressure Pes, or the saturation temperature (which corresponds to the evaporation temperature Te) corresponding to the suction pressure Ps becomes constant at a target low pressure Tes. Also, the operation capacity of the compressor 21 may be controlled such that the refrigerant temperature (which corresponds to the evaporation temperature Te) detected by the liquid side temperature sensors 44 and 54 of the indoor heat exchangers 42 and 52 becomes constant at the target low pressure Tes.

Then, by performing such evaporation pressure control, the state of the refrigerant flowing in the refrigerant pipes from the indoor heat exchangers 42 and 52 to the compressor 21 including the gas refrigerant communication pipe 7 and the accumulator 24 (see the portion from the indoor heat exchangers 42 and 52 to the compressor 21 in the hatching area indicated by the diagonal line in FIG. 5, which is hereinafter referred to as "gas refrigerant distribution portion D") becomes stabilized, creating a state where the refrigerant quantity in the gas refrigerant distribution portion D changes mainly by the evaporation pressure Pe (i.e., the suction pressure Ps), which is the operation state quantity equivalent to the pressure of the refrigerant in the gas refrigerant distribution portion D.

In addition, the reason to perform the condensation pressure control is that the condensation pressure Pc of the refrigerant is greatly affected by the refrigerant quantity in the outdoor heat exchanger 23 where high-pressure refrigerant flows while undergoing a phase change from a gas state to a liquid state as a result of heat exchange with the outdoor air (see the portions corresponding to the outdoor heat exchanger 23 in the area indicated by the diagonal line hatching and the black hatching in FIG. 5, which is hereinafter referred to as "condenser portion A"). The condensation pressure Pc of the refrigerant in the condenser portion A greatly changes due to the effect of the outdoor temperature Ta. Therefore, the air flow rate Wo of the room air supplied from the outdoor fan 28 to the outdoor heat exchanger 23 is controlled by the motor 28a, and thereby the condensation pressure Pc of the refrigerant in the outdoor heat exchanger 23 is maintained constant and the state of the refrigerant flowing in the condenser portion A is stabilized, creating a state where the refrigerant quantity in condenser portion A changes mainly by a subcooling degree SCo at the liquid side of the outdoor heat exchanger 23 (hereinafter regarded as the outlet of the outdoor heat exchanger 23 in the description regarding the refrigerant quantity judging operation). Note that, for the control of the condensation pressure Pc by the outdoor fan 28 in the present embodiment, the discharge pressure Pd of the compressor 21 detected by the discharge pressure sensor 30, which is the operation state quantity equivalent to the condensation pressure Pc of the refrigerant in the outdoor heat exchanger 23, or the temperature of the refrigerant flowing through the outdoor heat exchanger 23 (i.e., the condensation temperature Tc) detected by the heat exchanger temperature sensor 33 is used.

Then, by performing such condensation pressure control, the high-pressure liquid refrigerant flows along a flow path from the outdoor heat exchanger 23 to the indoor expansion valves 41 and 51 including the outdoor expansion valve 38, the portion on the main refrigerant circuit side of the subcooler 25, and the liquid refrigerant communication pipe 6 and a flow path from the outdoor heat exchanger 23 to the bypass expansion valve 62 of the bypass refrigerant circuit 61; the pressure of the refrigerant in the portions from the outdoor heat exchanger 23 to the indoor expansion valves 41 and 51 and to the bypass expansion valve 62 (see the area indicated by the black hatching in FIG. 5, which is hereinafter referred to as "liquid refrigerant distribution portion B") also becomes stabilized; and the liquid refrigerant distribution portion B is sealed by the liquid refrigerant, thereby becoming a stable state.

In addition, the reason to perform the liquid pipe temperature control is to prevent a change in the density of the refrigerant in the refrigerant pipes from the subcooler 25 to the indoor expansion valves 41 and 51 including the liquid refrigerant communication pipe 6 (see the portion from the subcooler 25 to the indoor expansion valves 41 and 51 in the liquid refrigerant distribution portion B shown in FIG. 5). Performance of the subcooler 25 is controlled by increasing or decreasing the flow rate of the refrigerant flowing in the bypass refrigerant circuit 61 such that the refrigerant temperature Tlp detected by the liquid pipe temperature sensor 35 disposed at the outlet on the main refrigerant circuit side of the subcooler 25 becomes constant at a target liquid pipe temperature Tlps, and by adjusting the quantity of heat exchange between the refrigerant flowing through the main refrigerant circuit side and the refrigerant flowing through the bypass refrigerant circuit side of the subcooler 25. Note that, the flow rate of the refrigerant flowing in the bypass refrigerant circuit 61 is increased or decreased by adjustment of the opening degree of the bypass expansion valve 62. In this way, the liquid pipe temperature control is achieved in which the refrigerant temperature in the refrigerant pipes from the subcooler 25 to the indoor expansion valves 41 and 51 including the liquid refrigerant communication pipe 6 becomes constant.

Then, by performing such liquid pipe temperature constant control, even when the refrigerant temperature Tco at the outlet of the outdoor heat exchanger 23 (i.e., the subcooling degree SCo of the refrigerant at the outlet of the outdoor heat exchanger 23) changes along with a gradual increase in the refrigerant quantity in the refrigerant circuit 10 by charging refrigerant into the refrigerant circuit 10, the effect of a change in the refrigerant temperature Tco at the outlet of the outdoor heat exchanger 23 will remain only within the refrigerant pipes from the outlet of the outdoor heat exchanger 23 to the subcooler 25, and the effect will not extend to the refrigerant pipes from the subcooler 25 to the indoor expansion valves 41 and 51 including the liquid refrigerant communication pipe 6 in the liquid refrigerant distribution portion B.

Further, the reason to perform the superheat degree control is because the refrigerant quantity in the evaporator portion C greatly affects the quality of wet vapor of the refrigerant at the outlets of the indoor heat exchangers 42 and 52. The superheat degree SHr of the refrigerant at the outlets of the indoor heat exchangers 42 and 52 is controlled such that the superheat degree SHr of the refrigerant at the gas sides of the indoor heat exchangers 42 and 52 (hereinafter regarded as the outlets of the indoor heat exchangers 42 and 52 in the description regarding the refrigerant quantity judging operation) becomes constant at the target superheat degree SHrs (in other words, the gas refrigerant at the outlets of the indoor heat exchangers 42 and 52 is in a superheat state) by controlling the opening degree of the indoor expansion valves 41 and 51, and thereby the state of the refrigerant flowing in the evaporator portion C is stabilized.

Consequently, by performing such superheat degree control, a state is created in which the gas refrigerant reliably flows into the gas refrigerant communication portion D.

By various control described above, the state of the refrigerant circulating in the refrigerant circuit 10 becomes stabilized, and the distribution of the refrigerant quantity in the refrigerant circuit 10 becomes constant. Therefore, when refrigerant starts to be charged into the refrigerant circuit 10 by additional refrigerant charging, which is subsequently performed, it is possible to create a state where a change in the refrigerant quantity in the refrigerant circuit 10 mainly appears as a change of the refrigerant quantity in the outdoor heat exchanger 23 (hereinafter this operation is referred to as "refrigerant quantity judging operation").

Such control as described above is performed as the process in Step S11 by the controller 8 (more specifically, by the indoor side controllers 47 and 57, the outdoor side controller 37, and the transmission line 8a that connects between the controllers 37, 47 and 57) that functions as a refrigerant quantity judging operation controlling means or section for performing the refrigerant quantity judging operation.

Note that, unlike the present embodiment, when refrigerant is not charged in advance in the outdoor unit 2, it is necessary prior to Step S11 to charge refrigerant until the refrigerant quantity reaches a level where constituent equipment will not abnormally stop during the above described refrigerant quantity judging operation.

(Step S12: Refrigerant Quantity Calculation)

Next, additional refrigerant is charged into the refrigerant circuit 10 while performing the above described refrigerant quantity judging operation. At this time, the controller 8 that functions as a refrigerant quantity calculating means or section calculates the refrigerant quantity in the refrigerant circuit 10 from the operation state quantity of constituent equipment or refrigerant flowing in the refrigerant circuit 10 during additional refrigerant charging in Step S12.

First, the refrigerant quantity calculating means in the present embodiment is described. The refrigerant quantity calculating means divides the refrigerant circuit 10 into a plurality of portions, calculates the refrigerant quantity for each divided portion, and thereby calculates the refrigerant quantity in the refrigerant circuit 10. More specifically, a relational expression between the refrigerant quantity in each portion and the operation state quantity of constituent equipment or refrigerant flowing in the refrigerant circuit 10 is set for each divided portion, and the refrigerant quantity in each portion can be calculated by using these relational expressions. In the present embodiment, in a state where the four-way switching valve 22 is represented by the solid lines in FIG. 1, i.e., a state where the discharge side of the compressor 21 is connected to the gas side of the outdoor heat exchanger 23 and where the suction side of the compressor 21 is connected to the outlets of the indoor heat exchangers 42 and 52 via the gas side stop valve 27 and the gas refrigerant communication pipe 7, the refrigerant circuit 10 is divided into the following portions and a relational expression is set for each portion: a portion corresponding to the compressor 21 and a portion from the compressor 21 to the outdoor heat exchanger 23 including the four-way switching valve 22 (not shown in FIG. 5) (hereinafter referred to as "high-pressure gas pipe portion E"); a portion corresponding to the outdoor heat exchanger 23 (i.e., the condenser portion A); a portion from the outdoor heat exchanger 23 to the subcooler 25 and an inlet side half of the portion corresponding to the main refrigerant circuit side of the subcooler 25 in the liquid refrigerant distribution portion B (hereinafter referred to as "high temperature side liquid pipe portion B1"); an outlet side half of a portion corresponding to the main refrigerant circuit side of the subcooler 25 and a portion from the subcooler 25 to the liquid side stop valve 26 (not shown in FIG. 5) in the liquid refrigerant distribution portion B (hereinafter referred to as "low temperature side liquid pipe portion B2"); a portion corresponding to the liquid refrigerant communication pipe 6 in the liquid refrigerant distribution portion B (hereinafter referred to as "liquid refrigerant communication pipe portion B3"); a portion from the liquid refrigerant communication pipe 6 in the liquid refrigerant distribution portion B to the gas refrigerant communication pipe 7 in the gas refrigerant distribution portion D including portions corresponding to the indoor expansion valves 41 and 51 and the indoor heat exchangers 42 and 52 (i.e., the evaporator portion C) (hereinafter referred to as "indoor unit portion F"); a portion corresponding to the gas refrigerant communication pipe 7 in the gas refrigerant distribution portion D (hereinafter referred to as "gas refrigerant communication pipe portion G"); a portion from the gas side stop valve 27 (not shown in FIG. 5) in the gas refrigerant distribution portion D to the compressor 21 including the four-way switching valve 22 and the accumulator 24 (hereinafter referred to as "low-pressure gas pipe portion H"); and a portion from the high temperature side liquid pipe portion B1 in the liquid refrigerant distribution portion B to the low-pressure gas pipe portion H including the bypass expansion valve 62 and a portion corresponding to the bypass refrigerant circuit side of the subcooler 25 (hereinafter referred to as "bypass circuit portion I"). Next, the relational expressions set for each portion described above are described.

In the present embodiment, a relational expression between a refrigerant quantity Mog1 in the high-pressure gas pipe portion E and the operation state quantity of constituent equipment or refrigerant flowing in the refrigerant circuit 10 is, for example, expressed by $$Mog1 = Vog1 \times \rho d,$$

which is a function expression in which a volume Vog1 of the high-pressure gas pipe portion E in the outdoor unit 2 is multiplied by the density ρd of the refrigerant in high-pressure gas pipe portion E. Note that, the volume Vog1 of the high-pressure gas pipe portion E is a value that is known prior to installation of the outdoor unit 2 at the installation location and is stored in advance in the memory of the controller 8. In addition, a density ρd of the refrigerant in the high-pressure gas pipe portion E is obtained by converting the discharge temperature Td and the discharge pressure Pd.

A relational expression between a refrigerant quantity Mc in the condenser portion A and the operation state quantity of constituent equipment or refrigerant flowing in the refrigerant circuit 10 is, for example, expressed by $$Mc = kc1 \times Ta + kc2 \times Tc + kc3 \times SHm + kc4 \times Wc + kc5 \times \rho c + kc6 \times \rho co + kc7,$$

which is a function expression of the outdoor temperature Ta, the condensation temperature Tc, a compressor discharge superheat degree SHm, the refrigerant circulation flow rate Wc, the saturated liquid density ρc of the refrigerant in the outdoor heat exchanger 23, and the density ρco of the refrigerant at the outlet of the outdoor heat exchanger 23. Note that, the parameters kc1 to kc7 in the above described relational expression are derived from a regression analysis of results of tests and detailed simulations and are stored in advance in the memory of the controller 8. In addition, the compressor discharge superheat degree SHm is a superheat degree of the refrigerant at the discharge side of the compressor, and is obtained by converting the discharge pressure Pd to refrigerant saturation temperature and subtracting this refrigerant saturation temperature from the discharge temperature Td. The refrigerant circulation flow rate Wc is expressed as a function of the evaporation temperature Te and the condensation temperature Tc (i.e., Wc=f(Te, Tc)). A saturated liquid density ρc of the refrigerant is obtained by converting the condensation temperature Tc. A density ρco of the refrigerant at the outlet of the outdoor heat exchanger 23 is obtained by converting the condensation pressure Pc is obtained by converting the condensation temperature Tc and the refrigerant temperature Tco.

A relational expression between a refrigerant quantity Mol1 in the high temperature liquid pipe portion B1 and the operation state quantity of constituent equipment or refrigerant flowing in the refrigerant circuit 10 is, for example, expressed by $$Mol1 = Vol1 \times \rho co,$$

which is a function expression in which a volume Vol1 of the high temperature liquid pipe portion B1 in the outdoor unit 2 is multiplied by the density ρco of the refrigerant in the high temperature liquid pipe portion B1 (i.e., the above described density of the refrigerant at the outlet of the outdoor heat exchanger 23). Note that, the volume Vol1 of the high-pressure liquid pipe portion B1 is a value that is known prior to installation of the outdoor unit 2 at the installation location and is stored in advance in the memory of the controller 8.

A relational expression between a refrigerant quantity Mol2 in the low temperature liquid pipe portion B2 and the operation state quantity of constituent equipment or refrigerant flowing in the refrigerant circuit 10 is, for example, expressed by $$Mol2 = Vol2 \times \rho lp,$$

which is a function expression in which a volume Vol2 of the low temperature liquid pipe portion B2 in the outdoor unit 2 is multiplied by a density ρlp of the refrigerant in the low temperature liquid pipe portion B2. Note that, the volume Vol2 of the low temperature liquid pipe portion B2 is a value that is known prior to installation of the outdoor unit 2 at the installation location and is stored in advance in the memory of the controller 8. In addition, the density ρlp of the refrigerant in the low temperature liquid pipe portion B2 is the density of the refrigerant at the outlet of the subcooler 25, and is obtained by converting the condensation pressure Pc and the refrigerant temperature Tlp at the outlet of the subcooler 25.

A relational expression between a refrigerant quantity Mlp in the liquid refrigerant communication pipe portion B3 and the operation state quantity of constituent equipment or refrigerant flowing in the refrigerant circuit 10 is, for example, expressed by $$Mlp=Vlp \times \rho lp,$$

which is a function expression in which a volume Vlp of the liquid refrigerant communication pipe 6 is multiplied by the density ρlp of the refrigerant in the liquid refrigerant communication pipe portion B3 (i.e., the density of the refrigerant at the outlet of the subcooler 25). Note that, as for the volume Vlp of the liquid refrigerant communication pipe 6, because the liquid refrigerant communication pipe 6 is a refrigerant pipe arranged on site when installing the air conditioner 1 at an installation location such as a building, a value calculated on site from the information regarding the length, pipe diameter and the like is input, or information regarding the length, pipe diameter and the like is input on site and the controller 8 calculates the volume Vlp from the input information of the liquid refrigerant communication pipe 6. Or, as described below, the volume Vlp is calculated by using the operation results of the pipe volume judging operation.

A relational expression between a refrigerant quantity Mr in the indoor unit portion F and the operation state quantity of constituent equipment or refrigerant flowing in the refrigerant circuit 10 is, for example, expressed by $$Mr=kr1 \times Tlp+kr2 \times \Delta T+kr3 \times SHr+kr4 \times Wr+kr5,$$

which is a function expression of the refrigerant temperature Tlp at the outlet of the subcooler 25, a temperature difference ΔT in which the evaporation temperature Te is subtracted from the room temperature Tr, the superheat degree SHr of the refrigerant at the outlets of the indoor heat exchangers 42 and 52, and the air flow rate Wr of the indoor fans 43 and 53. Note that, the parameters kr1 to kr5 in the above described relational expression are derived from a regression analysis of results of tests and detailed simulations and are stored in advance in the memory of the controller 8. Note that, here, the relational expression for the refrigerant quantity Mr is set for each of the two indoor units 4 and 5, and the entire refrigerant quantity in the indoor unit portion F is calculated by adding the refrigerant quantity Mr in the indoor unit 4 and the refrigerant quantity Mr in the indoor unit 5. Note that, relational expressions having parameters kr1 to kr5 with different values will be used when the model and/or capacity is different between the indoor unit 4 and the indoor unit 5.

A relational expression between a refrigerant quantity Mgp in the gas refrigerant communication pipe portion G and the operation state quantity of constituent equipment or refrigerant flowing in the refrigerant circuit 10 is, for example, expressed by $$Mgp=Vgp \times \rho gp,$$

which is a function expression in which a volume Vgp of the gas refrigerant communication pipe 7 is multiplied by a density ρgp of the refrigerant in the gas refrigerant communication pipe portion H. Note that, as for the volume Vgp of the gas refrigerant communication pipe 7, as is the case with the liquid refrigerant communication pipe 6, because the gas refrigerant communication pipe 7 is a refrigerant pipe arranged on site when installing the air conditioner 1 at an installation location such as a building, a value calculated on site from the information regarding the length, pipe diameter and the like is input, or information regarding the length, pipe diameter and the like is input on site and the controller 8 calculates the volume Vgp from the input information of the gas refrigerant communication pipe 7. Or, as described below, the volume Vgp is calculated by using the operation results of the pipe volume judging operation. In addition, the density ρgp of the refrigerant in the gas refrigerant communication pipe portion G is an average value between a density ρs of the refrigerant at the suction side of the compressor 21 and a density ρeo of the refrigerant at the outlets of the indoor heat exchangers 42 and 52 (i.e., the inlet of the gas refrigerant communication pipe 7). The density ρs of the refrigerant is obtained by converting the suction pressure Ps and the suction temperature Ts, and a density ρeo of the refrigerant is obtained by converting the evaporation pressure Pe, which is a converted value of the evaporation temperature Te, and an outlet temperature Teo of the indoor heat exchangers 42 and 52.

A relational expression between a refrigerant quantity Mog2 in the low-pressure gas pipe portion H and the operation state quantity of constituent equipment or refrigerant flowing in the refrigerant circuit 10 is, for example, expressed by $$Mog2=Vog2 \times \rho s,$$

which is a function expression in which a volume Vog2 of the low-pressure gas pipe portion H in the outdoor unit 2 is multiplied by the density ρs of the refrigerant in the low-pressure gas pipe portion H. Note that, the volume Vog2 of the low-pressure gas pipe portion H is a value that is known prior to shipment to the installation location and is stored in advance in the memory of the controller 8.

A relational expression between a refrigerant quantity Mob in the bypass circuit portion I and the operation state quantity of constituent equipment or refrigerant flowing in the refrigerant circuit 10 is, for example, expressed by $$Mob=kob1 \times \rho co+kob2 \times \rho s+kob3 \times Pe+kob4,$$

which is a function expression of a density ρco of the refrigerant at the outlet of the outdoor heat exchanger 23, and the density ρs and evaporation pressure Pe of the refrigerant at the outlet on the bypass circuit side of the subcooler 25. Note that, the parameters kob1 to kob3 in the above described relational expression are derived from a regression analysis of results of tests and detailed simulations and are stored in advance in the memory of the controller 8. In addition, the refrigerant quantity Mob of the bypass circuit portion I may be calculated using a simpler relational expression because the refrigerant quantity there is smaller compared to the other portions. For example, it is expressed as follows:

$$Mob=Vob \times \rho e \times kob5,$$

which is a function expression in which a volume Vob of the bypass circuit portion I is multiplied by the saturated liquid density ρe at the portion corresponding to the bypass circuit side of the subcooler 25 and a correct coefficient kob 5. Note that, the volume Vob of the bypass circuit portion I is a value that is known prior to installation of the outdoor unit 2 at the installation location and is stored in advance in the memory of the controller 8. In addition, the saturated liquid density ρe at the portion corresponding to the bypass circuit side of the subcooler 25 is obtained by converting the suction pressure Ps or the evaporation temperature Te.

Note that, in the present embodiment, one outdoor unit 2 is provided. However, when a plurality of outdoor units are connected, as for the refrigerant quantity in the outdoor unit such as Mog1, Mc, Mol1, Mol2, Mog2, and Mob, the relational expression for the refrigerant quantity in each portion is set for each of the plurality of outdoor units, and the entire refrigerant quantity in the outdoor units is calculated by adding the refrigerant quantity in each portion of the plurality of the outdoor units. Note that, relational expressions for the refrigerant quantity in each portion having parameters with different values will be used when a plurality of outdoor units with different models and capacities are connected.

As described above, in the present embodiment, by using the relational expressions for each portion in the refrigerant circuit 10, the refrigerant quantity in each portion is calculated from the operation state quantity of constituent equipment or refrigerant flowing in the refrigerant circuit 10 in the refrigerant quantity judging operation, and thereby the refrigerant quantity in the refrigerant circuit 10 can be calculated.

Further, this Step S12 is repeated until the condition for judging the adequacy of the refrigerant quantity in the below described Step S13 is satisfied. Therefore, in the period from the start to the completion of additional refrigerant charging, the refrigerant quantity in each portion is calculated from the operation state quantity during refrigerant charging by using the relational expressions for each portion in the refrigerant circuit 10. More specifically, a refrigerant quantity Mo in the outdoor unit 2 and the refrigerant quantity Mr in each of the indoor units 4 and 5 (i.e., the refrigerant quantity in each portion in the refrigerant circuit 10 excluding the refrigerant communication pipes 6 and 7) necessary for judgment of the adequacy of the refrigerant quantity in the below described Step S13 are calculated. Here, the refrigerant quantity Mo in the outdoor unit 2 is calculated by adding Mog1, Mc, Mol1, Mol2, Mog2, and Mob described above, each of which is the refrigerant quantity in each portion in the outdoor unit 2.

In this way, the process in Step S12 is performed by the controller 8 that functions as the refrigerant quantity calculating means for calculating the refrigerant quantity in each portion in the refrigerant circuit 10 from the operation state quantity of constituent equipment or refrigerant flowing in the refrigerant circuit 10 in the automatic refrigerant charging operation.

(Step S13: Judgment of the Adequacy of the Refrigerant Quantity)

As described above, when additional refrigerant charging into the refrigerant circuit 10 starts, the refrigerant quantity in the refrigerant circuit 10 gradually increases. Here, when the volumes of the refrigerant communication pipes 6 and 7 are unknown, the refrigerant quantity that should be charged into the refrigerant circuit 10 after additional refrigerant charging cannot be prescribed as the refrigerant quantity in the entire refrigerant circuit 10. However, when the focus is placed only on the outdoor unit 2 and the indoor units 4 and 5 (i.e., the refrigerant circuit 10 excluding the refrigerant communication pipes 6 and 7), it is possible to know in advance the optimal refrigerant quantity in the outdoor unit 2 in the normal operation mode by tests and detailed simulations. Therefore, additional refrigerant can be charged by the following manner: a value of this refrigerant quantity is stored in advance in the memory of the controller 8 as a target charging value Ms; the refrigerant quantity Mo in the outdoor unit 2 and a refrigerant quantity Mr in the indoor units 4 and 5 are calculated from the operation state quantity of constituent equipment or refrigerant flowing in the refrigerant circuit 10 in the automatic refrigerant charging operation by using the above described relational expressions; and additional refrigerant is charged until a value of the refrigerant quantity obtained by adding the refrigerant quantity Mo and the refrigerant quantity Mr reaches the target charging value Ms. In other words, Step S13 is a process to judge the adequacy of the refrigerant quantity charged into the refrigerant circuit 10 by additional refrigerant charging by judging whether or not the refrigerant quantity, which is obtained by adding the refrigerant quantity Mo in the outdoor unit 2 and the refrigerant quantity Mr in the indoor units 4 and 5 in the automatic refrigerant charging operation, has reached the target charging value Ms.

Further, in Step S13, when a value of the refrigerant quantity obtained by adding the refrigerant quantity Mo in the outdoor unit 2 and the refrigerant quantity Mr in the indoor units 4 and 5 is smaller than the target charging value Ms and additional refrigerant charging has not been completed, the process in Step S13 is repeated until the target charging value Ms is reached. In addition, when a value of the refrigerant quantity obtained by adding the refrigerant quantity Mo in the outdoor unit 2 and the refrigerant quantity Mr in the indoor units 4 and 5 reaches the target charging value Ms, additional refrigerant charging is completed, and Step S1 as the automatic refrigerant charging operation process is completed.

Note that, in the above described refrigerant quantity judging operation, as the amount of additional refrigerant charged into the refrigerant circuit 10 increases, a tendency of an increase in the subcooling degree SCo at the outlet of the outdoor heat exchanger 23 appears, causing the refrigerant quantity Mc in the outdoor heat exchanger 23 to increase, and the refrigerant quantity in the other portions tends to be maintained substantially constant. Therefore, the target charging value Ms may be set as a value corresponding to only the refrigerant quantity Mo in the outdoor unit 2 but not the outdoor unit 2 and the indoor units 4 and 5, or may be set as a value corresponding to the refrigerant quantity Mc in the outdoor heat exchanger 23, and additional refrigerant may be charged until the target charging value Ms is reached.

In this way, the process in Step S13 is performed by the controller 8 that functions as the refrigerant quantity judging means for judging the adequacy of the refrigerant quantity in the refrigerant circuit 10 in the refrigerant quantity judging operation of the automatic refrigerant charging operation (i.e., for judging whether or not the refrigerant quantity has reached the target charging value Ms).

(Step S2: Pipe Volume Judging Operation)

Figure 6:
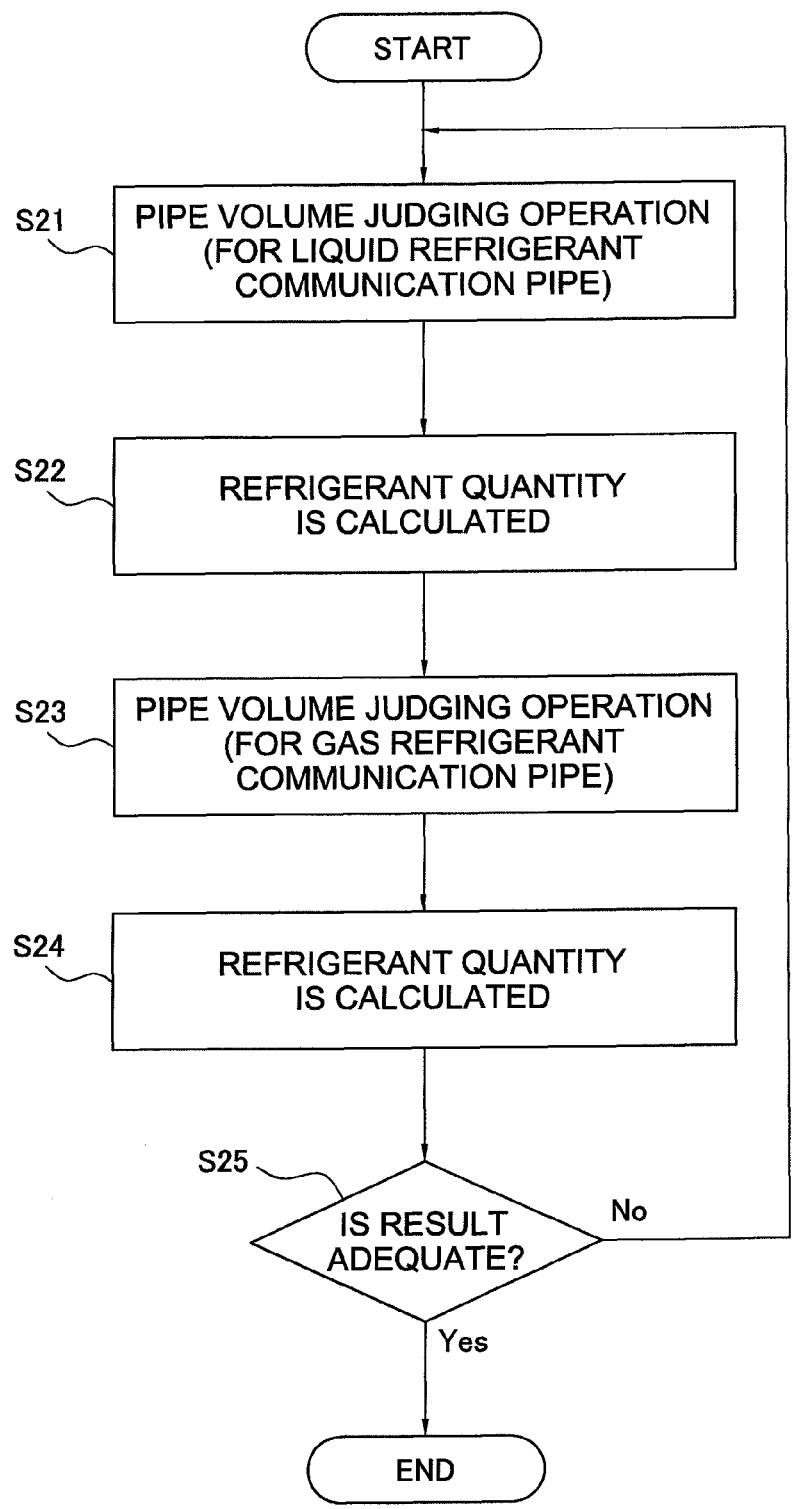
FIG. 6 is a flowchart of a pipe volume judging operation.

When the above described automatic refrigerant charging operation in Step S1 is completed, the process proceeds to the pipe volume judging operation in Step S2. In the pipe volume judging operation, the process from Step S21 to Step S25 as shown in FIG. 6 is performed by the controller 8. Here, FIG. 6 is a flowchart of the pipe volume judging operation.

(Steps S21, S22: Pipe Volume Judging Operation for Liquid Refrigerant Communication Pipe and Volume Calculation)

Figure 7:
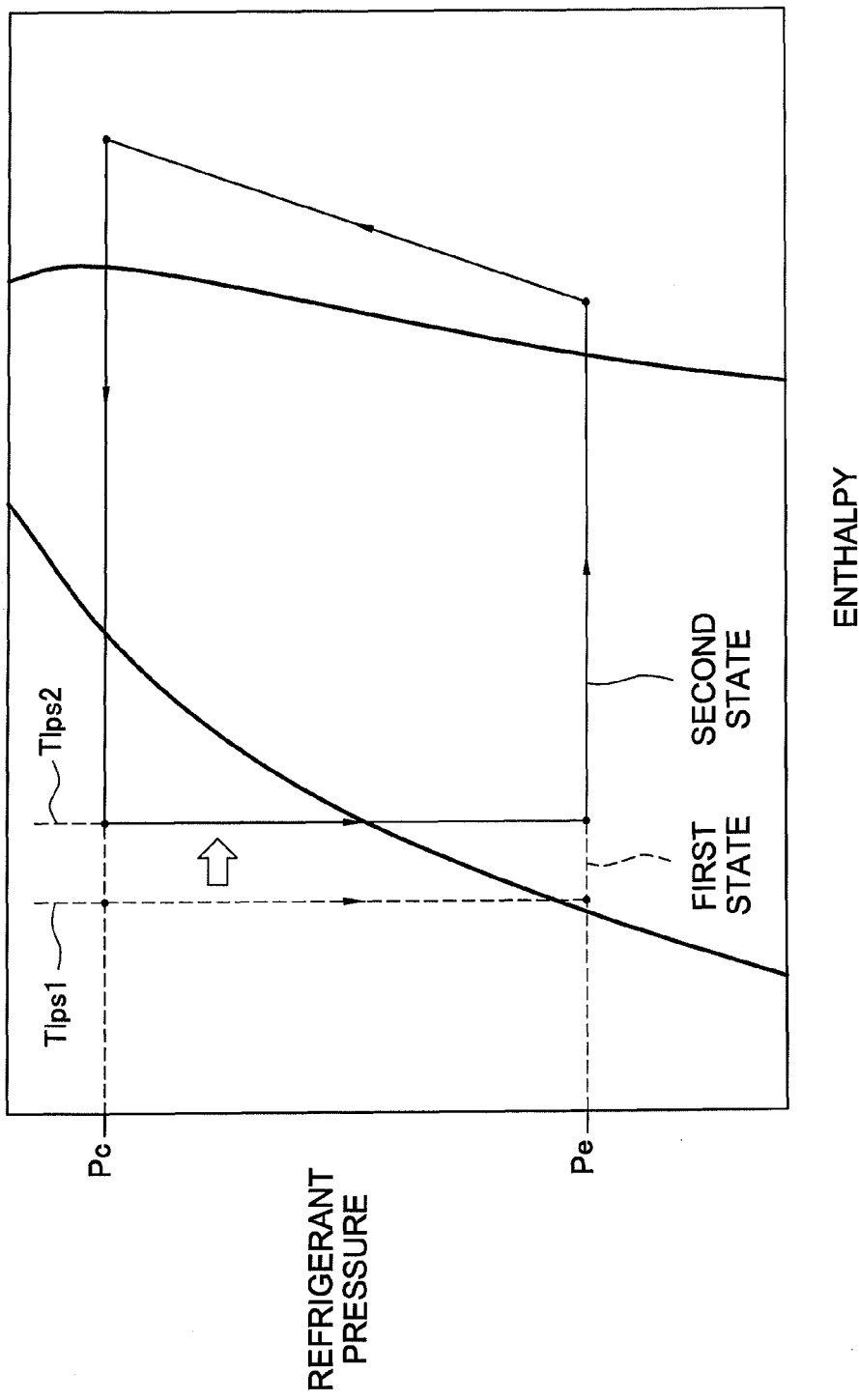
FIG. 7 is a Mollier diagram to show a refrigerating cycle of the air conditioner in the pipe volume judging operation for a liquid refrigerant communication pipe.

In Step S21, as is the case with the above described refrigerant quantity judging operation in Step S11 of the automatic refrigerant charging operation, the pipe volume judging operation for the liquid refrigerant communication pipe 6, including the all indoor unit operation, condensation pressure control, liquid pipe temperature control, superheat degree control, and evaporation pressure control, is performed. Here, the target liquid pipe temperature Tlps of the temperature Tlp of the refrigerant at the outlet on the main refrigerant circuit side of the subcooler 25 in the liquid pipe temperature control is regarded as a first target value Tlps1, and the state where the refrigerant quantity judging operation is stable at this first target value Tlps1 is regarded as a first state (see the refrigerating cycle indicated by the lines including the dotted lines in FIG. 7). Note that, FIG. 7 is a Mollier diagram to show the refrigerating cycle of the air conditioner 1 in the pipe volume judging operation for the liquid refrigerant communication pipe.

Next, the first state where the temperature Tlp of the refrigerant at the outlet on the main refrigerant circuit side of the subcooler 25 in liquid pipe temperature control is stable at the first target value Tlps1 is switched to a second state (see the refrigerating cycle indicated by the solid lines in FIG. 7) where the target liquid pipe temperature Tlps is changed to a second target value Tlps2 different from the first target value Tlps1 and stabilized without changing the conditions for other equipment controls, i.e., the conditions for the condensation pressure control, superheat degree control, and evaporation pressure control (i.e., without changing the target superheat degree SHrs and the target low pressure Tes). In the present embodiment, the second target value Tlps2 is a temperature higher than the first target value Tlps1.

In this way, by changing from the stable state at the first state to the second state, the density of the refrigerant in the liquid refrigerant communication pipe 6 decreases, and therefore a refrigerant quantity Mlp in the liquid refrigerant communication pipe portion B3 in the second state decreases compared to the refrigerant quantity in the first state. Then, the refrigerant whose quantity has decreased in the liquid refrigerant communication pipe portion B3 moves to other portions in the refrigerant circuit 10. More specifically, as described above, the conditions for other equipment controls other than the liquid pipe temperature control are not changed, and therefore the refrigerant quantity Mog1 in the high-pressure gas pipe portion E, the refrigerant quantity Mog2 in the low-pressure gas pipe portion H, and the refrigerant quantity Mgp in the gas refrigerant communication pipe portion G are maintained substantially constant, and the refrigerant whose quantity has decreased in the liquid refrigerant communication pipe portion B3 will move to the condenser portion A, the high temperature liquid pipe portion B1, the low temperature liquid pipe portion B2, the indoor unit portion F, and the bypass circuit portion I. In other words, the refrigerant quantity Mc in the condenser portion A, the refrigerant quantity Mol1 in the high temperature liquid pipe portion B1, the refrigerant quantity Mol2 in the low temperature liquid pipe portion B2, the refrigerant quantity Mr in the indoor unit portion F, and the refrigerant quantity Mob in the bypass circuit portion I will increase by the quantity of the refrigerant that has decreased in the liquid refrigerant communication pipe portion B3.

Such control as described above is performed as the process in Step S21 by the controller 8 (more specifically, by the indoor side controllers 47 and 57, the outdoor side controller 37, and the transmission line 8a that connects between the controllers 37, 47 and 57) that functions as pipe volume judging operation controlling means for performing the pipe volume judging operation to calculate the refrigerant quantity Mlp of the liquid refrigerant communication pipe 6.

Next in Step S22, the volume Vlp of the liquid refrigerant communication pipe 6 is calculated by utilizing a phenomenon that the refrigerant quantity in the liquid refrigerant communication pipe portion B3 decreases and the refrigerant whose quantity has decreased moves to other portions in the refrigerant circuit 10 because of the change from the first state to the second state.

First, a calculation formula used in order to calculate the volume Vlp of the liquid refrigerant communication pipe 6 is described. Provided that the quantity of the refrigerant that has decreased in the liquid refrigerant communication pipe portion B3 and moved to the other portions in the refrigerant circuit 10 by the above described pipe volume judging operation is a refrigerant increase/decrease quantity $\Delta Mlp$, and that the increase/decrease quantity of the refrigerant in each portion between the first state and the second state is $\Delta Mc$, $\Delta Mol1$, $\Delta Mol2$, $\Delta Mr$, and $\Delta Mob$ (here, the refrigerant quantity Mog1, the refrigerant quantity Mog2, and the refrigerant quantity Mgp are omitted because they are maintained substantially constant), the refrigerant increase/decrease quantity $\Delta Mlp$ can be, for example, calculated by the following function expression:

$$\Delta Mlp = -(\Delta Mc + \Delta Mol1 + \Delta Mol2 + \Delta Mr + \Delta Mob).$$

Then, this $\Delta Mlp$ value is divided by a density change quantity $\Delta \rho lp$ of the refrigerant between the first state and the second state in the liquid refrigerant communication pipe 6, and thereby the volume Vlp of the liquid refrigerant communication pipe 6 can be calculated. Note that, although there is little effect on a calculation result of the refrigerant increase/decrease quantity $\Delta Mlp$, the refrigerant quantity Mog1 and the refrigerant quantity Mog2 may be included in the above described function expression.

$$Vlp = \Delta Mlp / \Delta \rho lp$$

Note that, $\Delta Mc$, $\Delta Mol1$, $\Delta Mol2$, $\Delta Mr$, and $\Delta Mob$ can be obtained by calculating the refrigerant quantity in the first state and the refrigerant quantity in the second state by using the above described relational expression for each portion in the refrigerant circuit 10 and further by subtracting the refrigerant quantity in the first state from the refrigerant quantity in the second state. In addition, the density change quantity $\Delta \rho lp$ can be obtained by calculating the density of the refrigerant at the outlet of the subcooler 25 in the first state and the density of the refrigerant at the outlet of the subcooler 25 in the second state and further by subtracting the density of the refrigerant in the first state from the density of the refrigerant in the second state.

By using the calculation formula as described above, the volume Vlp of the liquid refrigerant communication pipe 6 can be calculated from the operation state quantity of constituent equipment or refrigerant flowing in the refrigerant circuit 10 in the first and second states.

Note that, in the present embodiment, the state is changed such that the second target value Tlps2 in the second state becomes a temperature higher than the first target value Tlps1 in the first state and therefore the refrigerant in the liquid refrigerant communication pipe portion B3 is moved to other portions in order to increase the refrigerant quantity in the other portions; thereby the volume Vlp in the liquid refrigerant communication pipe 6 is calculated from the increased quantity. However, the state may be changed such that the second target value Tlps2 in the second state becomes a temperature lower than the first target value Tlps1 in the first state and therefore the refrigerant is moved from other portions to the liquid refrigerant communication pipe portion B3 in order to decrease the refrigerant quantity in the other portions; thereby the volume Vlp in the liquid refrigerant communication pipe 6 is calculated from the decreased quantity.

In this way, the process in Step S22 is performed by the controller 8 that functions as the pipe volume calculating means for the liquid refrigerant communication pipe, which calculates the volume Vlp of the liquid refrigerant communication pipe 6 from the operation state quantity of constituent equipment or refrigerant flowing in the refrigerant circuit 10 in the pipe volume judging operation for the liquid refrigerant communication pipe 6.

(Steps S23, S24: Pipe Volume Judging Operation and Volume Calculation for the Gas Refrigerant Communication Pipe)

After the above described Step S21 and Step S22 are completed, the pipe volume judging operation for the gas refrigerant communication pipe 7, including the all indoor unit operation, condensation pressure control, liquid pipe temperature control, superheat degree control, and evaporation pressure control, is performed in Step S23. Here, the target low pressure Pes of the suction pressure Ps of the compressor 21 in the evaporation pressure control is regarded as a first target value Pes1, and the state where the refrigerant quantity judging operation is stable at this first target value Pes1 is regarded as a first state (see the refrigerating cycle indicated by the lines including the dotted lines in FIG. 8). Note that FIG. 8 is a Mollier diagram to show the refrigerating cycle of the air conditioner 1 in the pipe volume judging operation for the gas refrigerant communication pipe.

Figure 8:
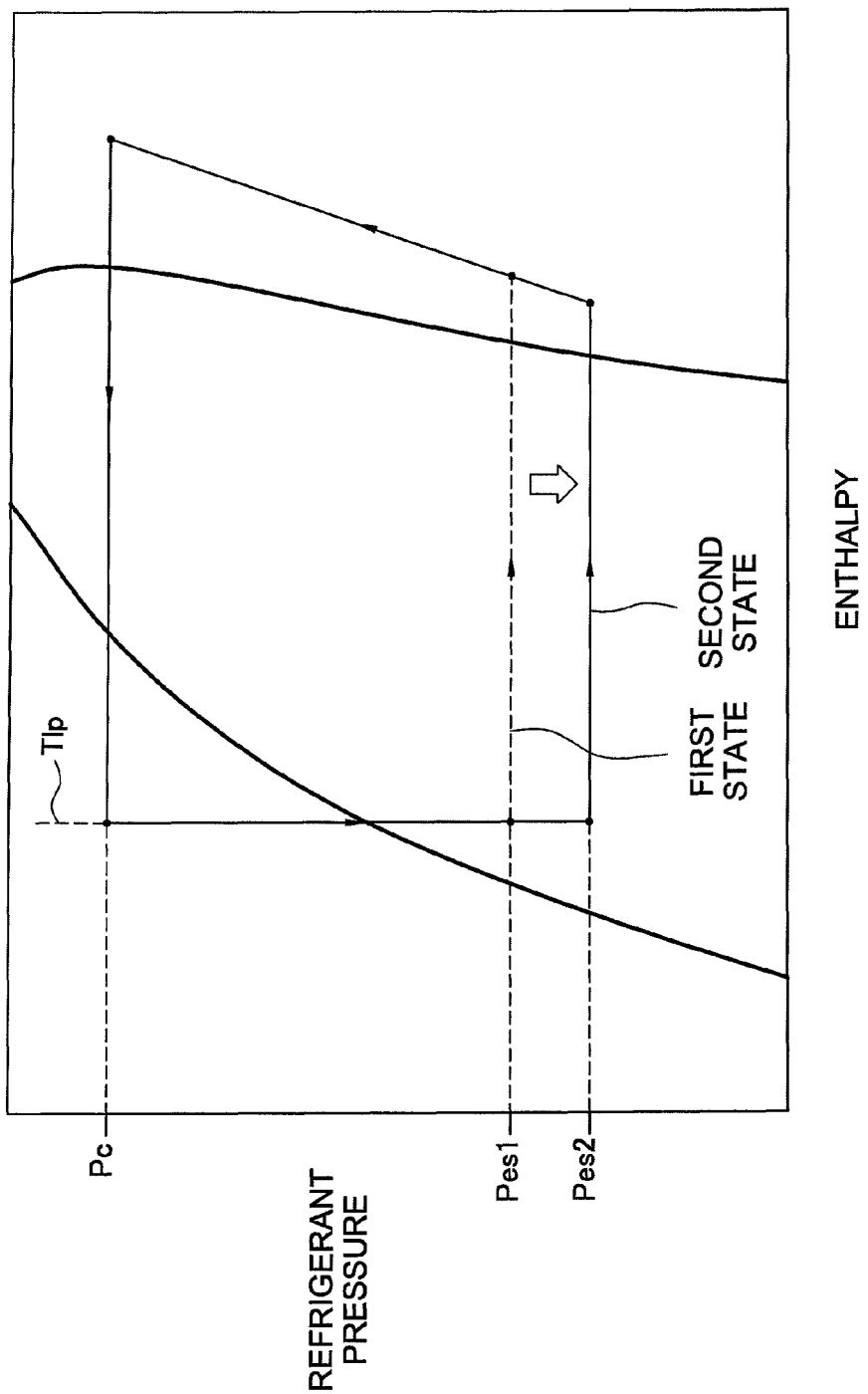
FIG. 8 is a Mollier diagram to show a refrigerating cycle of the air conditioner in the pipe volume judging operation for a gas refrigerant communication pipe.

Next, the first state where the target low pressure Pes of the suction pressure Ps in the compressor 21 in evaporation pressure control is stable at the first target value Pes1 is switched to a second state (see the refrigerating cycle indicated by only the solid lines in FIG. 8) where the target low pressure Pes is changed to a second target value Pes2 different from the first target value Pes1 and stabilized without changing the conditions for other equipment controls, i.e., without changing the conditions for the liquid pipe temperature control, the condensation pressure control, and the superheat degree control (i.e., without changing target liquid pipe temperature Tlps and target superheat degree SHrs). In the present embodiment, the second target value Pes2 is a pressure lower than the first target value Pes1.

In this way, by changing the target value Pes from the stable state at the first state to the second state, the density of the refrigerant in the gas refrigerant communication pipe 7 decreases, and therefore the refrigerant quantity Mgp in the gas refrigerant communication pipe portion G in the second state decreases compared to the refrigerant quantity in the first state. Then, the refrigerant whose quantity has decreased in the gas refrigerant communication pipe portion G will move to other portions in the refrigerant circuit 10. More specifically, as described above, the conditions for other equipment controls other than the evaporation pressure control are not changed, and therefore the refrigerant quantity Mog1 in the high pressure gas pipe portion E, the refrigerant quantity Mol1 in the high-temperature liquid pipe portion B1, the refrigerant quantity Mol2 in the low temperature liquid pipe portion B2, and the refrigerant quantity Mlp in the liquid refrigerant communication pipe portion B3 are maintained substantially constant, and the refrigerant whose quantity has decreased in the gas refrigerant communication pipe portion G will move to the low-pressure gas pipe portion H, the condenser portion A, the indoor unit portion F, and the bypass circuit portion I. In other words, the refrigerant quantity Mog2 in the low-pressure gas pipe portion H, the refrigerant quantity Mc in the condenser portion A, the refrigerant quantity Mr in the indoor unit portion F, and the refrigerant quantity Mob in the bypass circuit portion I will increase by the quantity of the refrigerant that has decreased in the gas refrigerant communication pipe portion G.

Such control as described above is performed as the process in Step S23 by the controller 8 (more specifically, by the indoor side controllers 47 and 57, the outdoor side controller 37, and the transmission line 8a that connects between the controllers 37 and 47, and 57) that functions as the pipe volume judging operation controlling means for performing the pipe volume judging operation to calculate the volume Vgp of the gas refrigerant communication pipe 7.

Next in Step S24, the volume Vgp of the gas refrigerant communication pipe 7 is calculated by utilizing a phenomenon that the refrigerant quantity in the gas refrigerant communication pipe portion G decreases and the refrigerant whose quantity has decreased moves to other portions in the refrigerant circuit 10 because of the change from the first state to the second state.

First, a calculation formula used in order to calculate the volume Vgp of the gas refrigerant communication pipe 7 is described. Provided that the quantity of the refrigerant that has decreased in the gas refrigerant communication pipe portion G and moved to the other portions in the refrigerant circuit 10 by the above described pipe volume judging operation is a refrigerant increase/decrease quantity $\Delta Mgp$, and that increase/decrease quantities of the refrigerant in respective portion between the first state and the second state are $\Delta Mc$, $\Delta Mog2$, $\Delta Mr$, and $\Delta Mob$ (here, the refrigerant quantity Mog1, the refrigerant quantity Mol1, the refrigerant quantity Mol2, and the refrigerant quantity Mlp are omitted because they are maintained substantially constant), the refrigerant increase/decrease quantity $\Delta Mgp$ can be, for example, calculated by the following function expression:

$$\Delta Mgp = -(\Delta Mc + \Delta Mog2 + \Delta Mr + \Delta Mob).$$

Then, this $\Delta Mgp$ value is divided by a density change quantity $\Delta \rho gp$ of the refrigerant between the first state and the second state in the gas refrigerant communication pipe 7, and thereby the volume Vgp of the gas refrigerant communication pipe 7 can be calculated. Note that, although there is little effect on a calculation result of the refrigerant increase/decrease quantity $\Delta Mgp$, the refrigerant quantity Mog1, the refrigerant quantity Mol1, and the refrigerant quantity Mol2 may be included in the above described function expression.

$$Vgp = \Delta Mgp / \Delta \rho gp$$

Note that, $\Delta Mc$, $\Delta Mog2$, $\Delta Mr$ and $\Delta Mob$ can be obtained by calculating the refrigerant quantity in the first state and the refrigerant quantity in the second state by using the above described relational expression for each portion in the refrigerant circuit 10 and further by subtracting the refrigerant quantity in the first state from the refrigerant quantity in the second state. In addition, the density change quantity $\Delta \rho gp$ can be obtained by calculating an average density between the density $\rho s$ of the refrigerant at the suction side of the compressor 21 in the first state and the density $\rho eo$ of the refrigerant at the outlets of the indoor heat exchangers 42 and 52 in the first state and by subtracting the average density in the first state from the average density in the second state.

By using such calculation formula as described above, the volume Vgp of the gas refrigerant communication pipe 7 can be calculated from the operation state quantity of constituent equipment or refrigerant flowing in the refrigerant circuit 10 in the first and second states.

Note that, in the present embodiment, the state is changed such that the second target value Pes2 in the second state becomes a pressure lower than the first target value Pes1 in the first state and therefore the refrigerant in the gas refrigerant communication pipe portion G is moved to other portions in order to increase the refrigerant quantity in the other portions; thereby the volume Vlp of the gas refrigerant communication pipe 7 is calculated from the increased quantity. However, the state may be changed such that the second target value Pes2 in the second state becomes a pressure higher than the first target value Pes1 in the first state and therefore the refrigerant is moved from other portions to the gas refrigerant communication pipe portion G in order to decrease the refrigerant quantity in the other portions; thereby the volume Vlp in the gas refrigerant communication pipe 7 is calculated from the decreased quantity.

In this way, the process in Step S24 is performed by the controller 8 that functions as the pipe volume calculating means for the gas refrigerant communication pipe, which calculates the volume Vgp of the gas refrigerant communication pipe 7 from the operation state quantity of constituent equipment or refrigerant flowing in the refrigerant circuit 10 in the pipe volume judging operation for the gas refrigerant communication pipe 7.

(Step S25: Adequacy Judgment of the Pipe Volume Judging Operation Result)

After the above described Step S21 to Step S24 are completed, Step S25 is performed to judge whether or not a result of the pipe volume judging operation is adequate, in other words, whether or not the volumes Vlp, Vgp of the refrigerant communication pipes 6 and 7 calculated by the pipe volume calculating means are adequate.

Specifically, as shown in an inequality expression below, judgment is made based on whether or not the ratio of the volume Vlp of the liquid refrigerant communication pipe 6 to the volume Vgp of the gas refrigerant communication pipe 7 obtained by the calculations is in a predetermined numerical value range.

$$\epsilon 1 < Vlp/Vgp < \epsilon 2$$

Here, $\epsilon 1$ and $\epsilon 2$ are values that are changed based on the minimum value and the maximum value of the pipe volume ratio in feasible combinations of the heat source unit and the utilization units.

Then, when the volume ratio Vlp/Vgp satisfies the above described numerical value range, the process in Step S2 of the pipe volume judging operation is completed. When the volume ratio Vlp/Vgp does not satisfy the above described numerical value range, the process for the pipe volume judging operation and volume calculation in Step S21 to Step S24 is performed again.

In this way, the process in Step S25 is performed by the controller 8 that functions as the adequacy judging means for judging whether or not a result of the above described pipe volume judging operation is adequate, in other words, whether or not the volumes Vlp, Vgp of the refrigerant communication pipes 6 and 7 calculated by the pipe volume calculating means are adequate.

Note that, in the present embodiment, the pipe volume judging operation (Steps S21, S22) for the liquid refrigerant communication pipe 6 is first performed and then the pipe volume judging operation for the gas refrigerant communication pipe 7 (Steps S23, S24) is performed. However, the pipe volume judging operation for the gas refrigerant communication pipe 7 may be performed first.

In addition, in the above described Step S25, when a result of the pipe volume judging operation in Steps S21 to S24 is judged to be inadequate for a plurality of times, or when it is desired to more simply judge the volumes Vlp, Vgp of the refrigerant communication pipes 6 and 7, although it is not shown in FIG. 6, for example, in Step S25, after a result of the pipe volume judging operation in Steps S21 to S24 is judged to be inadequate, it is possible to proceed to the process for estimating the lengths of the refrigerant communication pipes 6 and 7 from the pressure loss in the refrigerant communication pipes 6 and 7 and calculating the volumes Vlp, Vgp of the refrigerant communication pipes 6 and 7 from the estimated pipe lengths and an average volume ratio, thereby obtaining the volumes Vlp, Vgp of the refrigerant communication pipes 6 and 7.

In addition, in the present embodiment, the case where the pipe volume judging operation is performed to calculate the volumes Vlp, Vgp of the refrigerant communication pipes 6 and 7 is described on the premise that there is no information regarding the lengths, pipe diameters and the like of the refrigerant communication pipes 6 and 7 and the volumes Vlp, Vgp of the refrigerant communication pipes 6 and 7 are unknown. However, when the pipe volume calculating means has a function to calculate the volumes Vlp, Vgp of the refrigerant communication pipes 6 and 7 by inputting information regarding the lengths, pipe diameters and the like of the refrigerant communication pipes 6 and 7, such function may be used together.

Further, when the above described function to calculate the volumes Vlp, Vgp of the refrigerant communication pipes 6 and 7 by using the pipe volume judging operation and the operation results thereof is not used but only the function to calculate the volumes Vlp, Vgp of the refrigerant communication pipes 6 and 7 by inputting information regarding the lengths, pipe diameters and the like of the refrigerant communication pipes 6 and 7 is used, the above described adequacy judging means (Step 25) may be used to judge whether or not the input information regarding the lengths, pipe diameters and the like of the refrigerant communication pipes 6 and 7 is adequate.

(Step S3: Initial Refrigerant Quantity Detection Operation)

Figure 9:
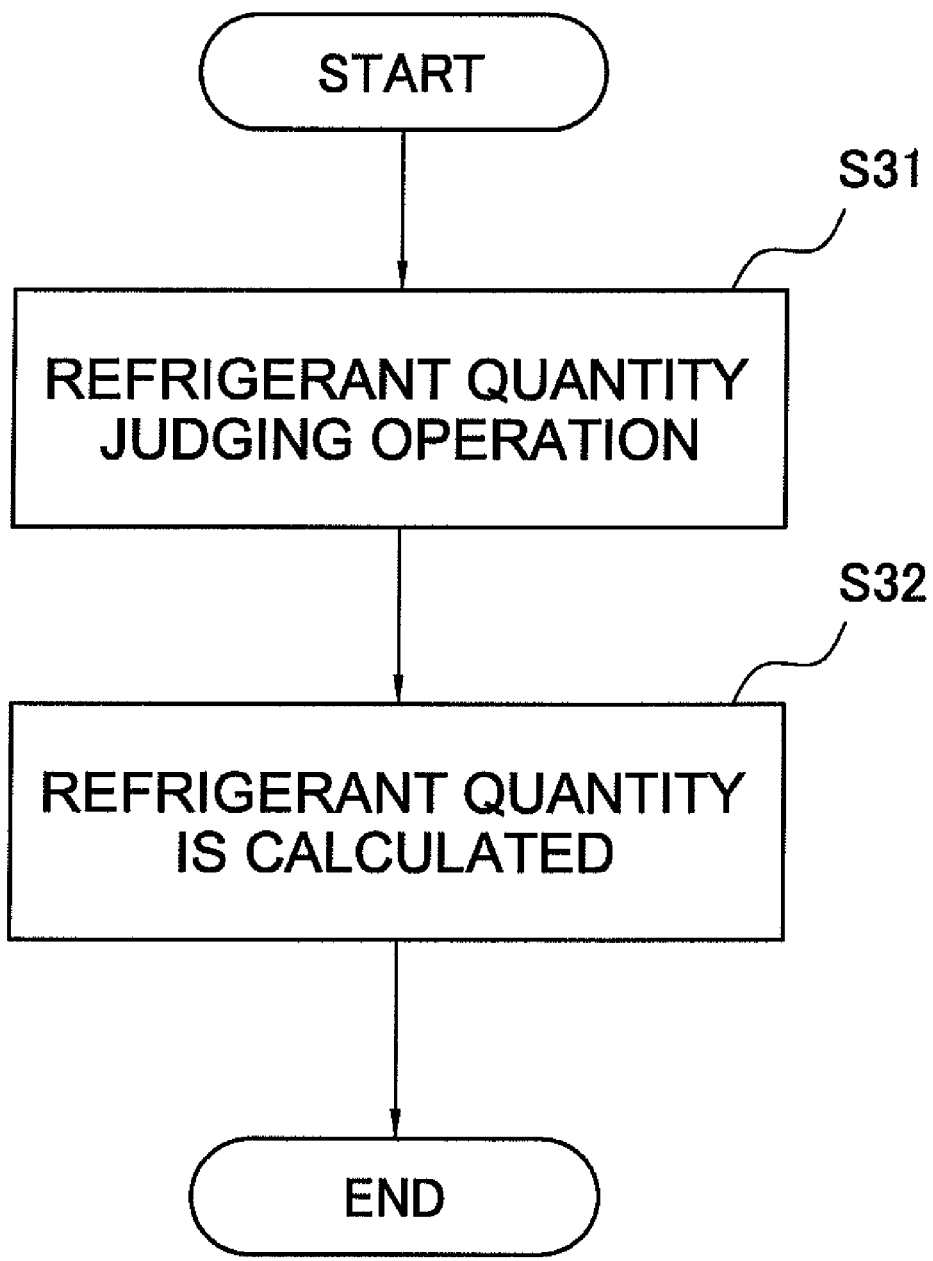
FIG. 9 is a flowchart of an initial refrigerant quantity judging operation.

When the above described pipe volume judging operation in Step S2 is completed, the process proceeds to an initial refrigerant quantity judging operation in Step S3. In the initial refrigerant quantity detection operation, the process in Step S31 and Step S32 shown in FIG. 9 is performed by the controller 8. Here, FIG. 9 is a flowchart of the initial refrigerant quantity detection operation.

(Step S31: Refrigerant Quantity Judging Operation)

In Step S31, as is the case with the above described refrigerant quantity judging operation in Step S11 of the automatic refrigerant charging operation, the refrigerant quantity judging operation, including the all indoor unit operation, condensation pressure control, liquid pipe temperature control, superheat degree control, and evaporation pressure control, is performed. Here, as a rule, values that are the same as the target values in the refrigerant quantity judging operation in Step S11 of the automatic refrigerant charging operation are used for the target liquid pipe temperature Tlps in the liquid pipe temperature control, the target superheat degree SHrs in the superheat degree control, and the target low pressure Pes in the evaporation pressure control.

In this way, the process in Step S31 is performed by the controller 8 that functions as the refrigerant quantity judging operation controlling means for performing the refrigerant quantity judging operation, including the all indoor unit operation, condensation pressure control, liquid pipe temperature control, superheat degree control, and evaporation pressure control.

(Step S32: Refrigerant Quantity Calculation)

Next, the refrigerant quantity in the refrigerant circuit 10 is calculated from the operation state quantity of constituent equipment or refrigerant flowing in the refrigerant circuit 10 in the initial refrigerant quantity judging operation in Step S32 by the controller 8 that functions as the refrigerant quantity calculating means while performing the above described refrigerant quantity judging operation. Calculation of the refrigerant quantity in the refrigerant circuit 10 is performed by using the above described relational expressions between the refrigerant quantity in each portion in the refrigerant circuit 10 and the operation state quantity of constituent equipment or refrigerant flowing in the refrigerant circuit 10. However, at this time, the volumes Vlp and Vgp of the refrigerant communication pipes 6 and 7, which were unknown at the time of after installation of constituent equipment of the air conditioner 1, have been calculated and the values thereof are known by the above described pipe volume judging operation. Thus, by multiplying the volumes Vlp and Vgp of the refrigerant communication pipes 6 and 7 by the density of the refrigerant, the refrigerant quantities Mlp, Mgp in the refrigerant communication pipes 6 and 7 can be calculated, and further by adding the refrigerant quantity in the other each portion, the initial refrigerant quantity in the entire refrigerant circuit 10 can be detected. This initial refrigerant quantity is used as a reference refrigerant quantity Mi of the entire refrigerant circuit 10, which serves as the reference for judging whether or not the refrigerant is leaking from the refrigerant circuit 10 in the below described refrigerant leak detection operation. Therefore, it is stored as a value of the operation state quantity in the memory of the controller 8 as state quantity storing means.

In this way, the process in Step S32 is performed by the controller 8 that functions as the refrigerant quantity calculating means for calculating the refrigerant quantity in each portion in the refrigerant circuit 10 from the operation state quantity of constituent equipment or refrigerant flowing in the refrigerant circuit 10 in the initial refrigerant quantity detecting operation.

<Refrigerant Leak Detection Operation Mode>

Figure 10:
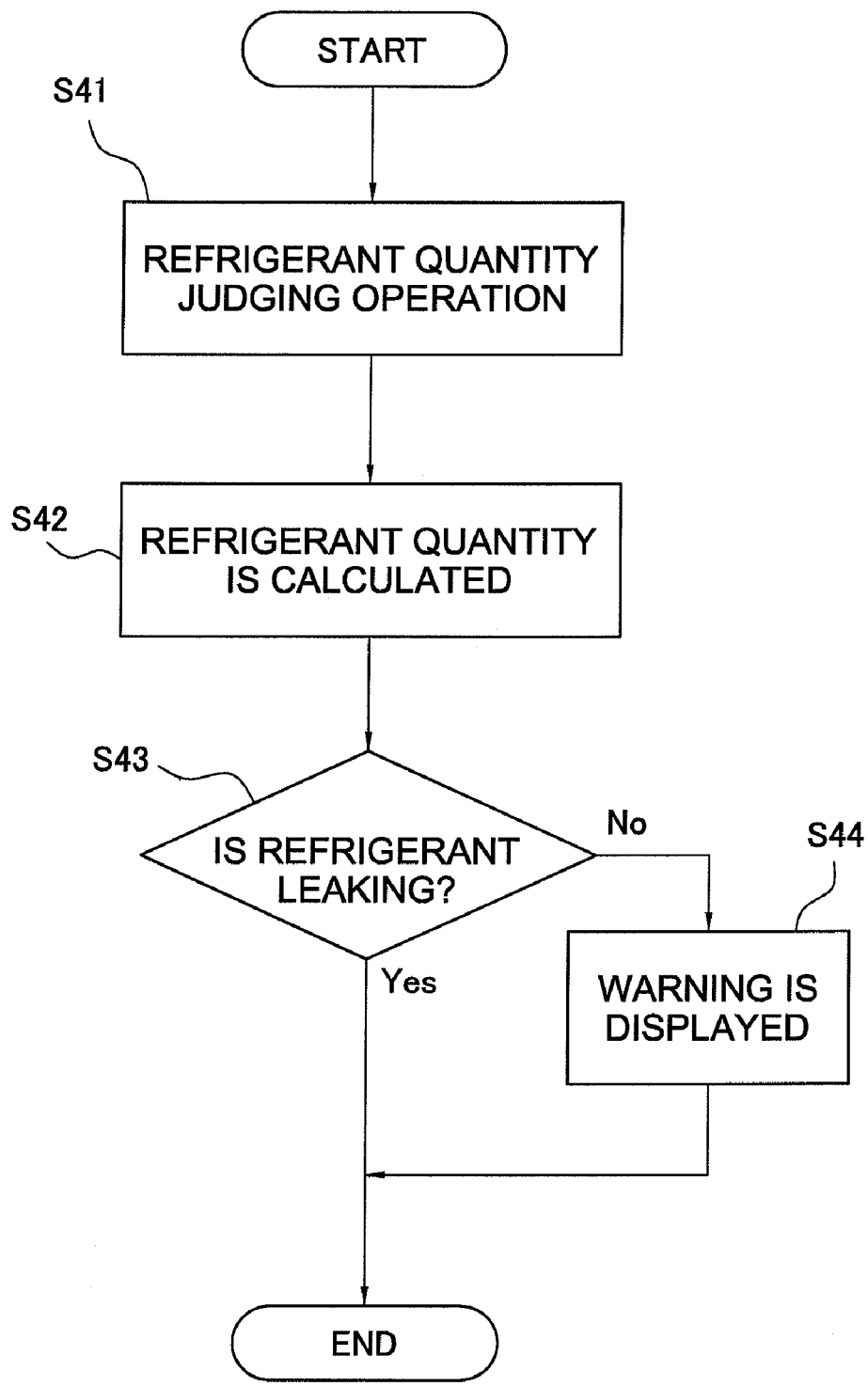
FIG. 10 is a flowchart of a refrigerant leak detection operation mode.

Next, the refrigerant leak detection operation mode is described with reference to FIGS. 1, 2, 5, and 10. Here, FIG. 10 is a flowchart of the refrigerant leak detection operation mode.

In the present embodiment, an example of a case is described where, whether or not the refrigerant in the refrigerant circuit 10 is leaking to the outside due to an unforeseen factor is detected periodically (for example, during a period of time such as on a holiday or in the middle of the night when air conditioning is not needed).

(Step S41: Refrigerant Quantity Judging Operation)

First, when operation in the normal operation mode such as the above described cooling operation and heating operation has gone on for a certain period of time (for example, half a year to a year), the normal operation mode is automatically or manually switched to the refrigerant leak detection operation mode, and as is the case with the refrigerant quantity judging operation of the initial refrigerant quantity detection operation, the refrigerant quantity judging operation, including the all indoor unit operation, condensation pressure control, liquid pipe temperature control, superheat degree control, and evaporation pressure control, is performed. Here, as a rule, values that are the same as the target values in Step S31 of the refrigerant quantity judging operation of the initial refrigerant quantity detection operation are used for the target liquid pipe temperature Tlps in the liquid pipe temperature control, the target superheat degree SHrs in the superheat degree control, and the target low pressure Pes in the evaporation pressure control.

Note that, this refrigerant quantity judging operation is performed for each time the refrigerant leak detection operation is performed. Even when the refrigerant temperature Tco at the outlet of the outdoor heat exchanger 23 fluctuates due to the different operating conditions, for example, such as when the condensation pressure Pc is different or when the refrigerant is leaking, the refrigerant temperature Tlp in the liquid refrigerant communication pipe 6 is maintained constant at the same target liquid pipe temperature Tlps by the liquid pipe temperature control.

In this way, the process in Step S41 is performed by the controller 8 that functions as the refrigerant quantity judging operation controlling means for performing the refrigerant quantity judging operation, including the all indoor unit operation, condensation pressure control, liquid pipe temperature control, superheat degree control, and evaporation pressure control.

(Step S42: Refrigerant Quantity Calculation)

Next, the refrigerant quantity in the refrigerant circuit 10 is calculated from the operation state quantity of constituent equipment or refrigerant flowing in the refrigerant circuit 10 in the refrigerant leak detection operation in Step S42 by the controller 8 that functions as the refrigerant quantity calculating means while performing the above described refrigerant quantity judging operation. Calculation of the refrigerant quantity in the refrigerant circuit 10 is performed by using the above described relational expression between the refrigerant quantity in each portion in the refrigerant circuit 10 and the operation state quantity of constituent equipment or refrigerant flowing in the refrigerant circuit 10. However, at this time, as is the case with the initial refrigerant quantity judging operation, the volumes Vlp and Vgp of the refrigerant communication pipes 6 and 7, which were unknown at the time of after installation of constituent equipment of the air conditioner 1, have been calculated and the values thereof are known by the above described pipe volume judging operation. Thus, by multiplying the volumes Vlp and Vgp of the refrigerant communication pipes 6 and 7 by the density of the refrigerant, the refrigerant quantities Mlp, Mgp in the refrigerant communication pipes 6 and 7 can be calculated, and further by adding the refrigerant quantity in the other each portion, the refrigerant quantity M in the entire refrigerant circuit 10 can be calculated.

Here, as described above, the refrigerant temperature Tlp in the liquid refrigerant communication pipe 6 is maintained constant at the target liquid pipe temperature Tlps by the liquid pipe temperature control. Therefore, regardless the difference in the operating conditions for the refrigerant leak detection operation, the refrigerant quantity Mlp in the liquid refrigerant communication pipe portion B3 will be maintained constant even when the refrigerant temperature Tco at the outlet of the outdoor heat exchanger 23 changes.

In this way, the process in Step S42 is performed by the controller 8 that functions as the refrigerant quantity calculating means for calculating the refrigerant quantity at each portion in the refrigerant circuit 10 from the operation state quantity of constituent equipment or refrigerant flowing in the refrigerant circuit 10 in the refrigerant leak detection operation.

(Steps S43, S44: Adequacy Judgment of the Refrigerant Quantity, Warning Display)

When refrigerant leaks from the refrigerant circuit 10, the refrigerant quantity in the refrigerant circuit 10 decreases. Then, when the refrigerant quantity in the refrigerant circuit 10 decreases, mainly, a tendency of a decrease in the subcooling degree SCo at the outlet of the outdoor heat exchanger 23 appears. Along with this, the refrigerant quantity Mc in the outdoor heat exchanger 23 decreases, and the refrigerant quantities in other portions tend to be maintained substantially constant. Consequently, the refrigerant quantity M of the entire refrigerant circuit 10 calculated in the above described Step S42 is smaller than the reference refrigerant quantity Mi detected in the initial refrigerant quantity detection operation when the refrigerant is leaking from the refrigerant circuit 10; whereas when the refrigerant is not leaking from the refrigerant circuit 10, the refrigerant quantity M is substantially the same as the reference refrigerant quantity Mi.

By utilizing the above-described characteristics, whether or not the refrigerant is leaking is judged in Step S43. When it is judged in Step S43 that the refrigerant is not leaking from the refrigerant circuit 10, the refrigerant leak detection operation mode is finished.

On the other hand, when it is judged in Step S43 that the refrigerant is leaking from the refrigerant circuit 10, the process proceeds to Step S44, and a warning indicating that a refrigerant leak is detected is displayed on the warning display 9. Subsequently, the refrigerant leak detection operation mode is finished.

In this way, the process from Steps S42 to S44 is performed by the controller 8 that functions as the refrigerant leak detection means, which is one of the refrigerant quantity judging means, and which detects whether or not the refrigerant is leaking by judging the adequacy of the refrigerant quantity in the refrigerant circuit 10 while performing the refrigerant quantity judging operation in the refrigerant leak detection operation mode.

As described above, in the air conditioner 1 in the present embodiment, the controller 8 functions as the refrigerant quantity judging operation means, the refrigerant quantity calculating means, the refrigerant quantity judging means, the pipe volume judging operation means, the pipe volume calculating means, the adequacy judging means, and the state quantity storing means, and thereby configures the refrigerant quantity judging system for judging the adequacy of the refrigerant quantity charged into the refrigerant circuit 10.

(3) Characteristics of the Air Conditioner

The air conditioner 1 in the present embodiment has the following characteristics.

(A)

In the air conditioner 1 in the present embodiment, the refrigerant circuit 10 is divided into a plurality of portions, and the relational expression between the refrigerant quantity and the operation state quantity is set for each portion. Consequently, compared to the conventional case where a simulation of characteristics of a refrigerating cycle is performed, the calculation load can be reduced, and the operation state quantity that is important for calculation of the refrigerant quantity in each portion can be selectively incorporated as a variable of the relational expression, thus improving the calculation accuracy of the refrigerant quantity in each portion. As a result, the adequacy of the refrigerant quantity in the refrigerant circuit 10 can be judged with high accuracy.

For example, by using the relational expressions, the controller 8 as the refrigerant quantity calculating means can quickly calculate the refrigerant quantity in each portion from the operation state quantity of constituent equipment or refrigerant flowing in the refrigerant circuit 10 in the automatic refrigerant charging operation in which the refrigerant is charged into the refrigerant circuit 10. Moreover, by using the calculated refrigerant quantity in each portion, the controller 8 as the refrigerant quantity judging means can judge with high accuracy whether or not the refrigerant quantity in the refrigerant circuit 10 (specifically, a value obtained by adding the refrigerant quantity Mo in the outdoor unit 2 and the refrigerant quantity Mr in the indoor units 4 and 5) has reached the target charging value Ms.

In addition, by using the relational expressions, the controller 8 can quickly calculate the initial refrigerant quantity as the reference refrigerant quantity Mi by calculating the refrigerant quantity in each portion from the operation state quantity of constituent equipment or refrigerant flowing in the refrigerant circuit 10 in the initial refrigerant quantity detection operation in which the initial refrigerant quantity after constituent equipment is installed or after the refrigerant is charged into the refrigerant circuit 10 is detected. Moreover, it is possible to detect the initial refrigerant quantity with high accuracy.

Further, by using the relational expressions, the controller 8 can quickly calculate the refrigerant quantity in each portion from the operation state quantity of constituent equipment or refrigerant flowing in the refrigerant circuit 10 in the refrigerant leak detection operation in which whether or not there is a refrigerant leak from the refrigerant circuit 10 is judged. Moreover, the controller 8 can judge with high accuracy whether or not the refrigerant is leaking from the refrigerant circuit 10 by comparison between the calculated refrigerant quantity in each portion and the reference refrigerant quantity Mi that serves as a reference for judging whether or not the refrigerant is leaking.

(B)

In the air conditioner 1 in the present embodiment, the refrigerant circuit 10 is divided into the refrigerant communication pipes 6 and 7 (i.e., the liquid refrigerant communication pipe portion B3 and the gas refrigerant communication pipe portion G) where the refrigerant quantity changes depending on conditions such as an installation location and the like and the portion other than the refrigerant communication pipes 6 and 7 (here, the outdoor unit 2 as the heat source unit and the indoor units 4 and 5 as the utilization units), and the relational expressions between the refrigerant quantity in each portion and the operation state quantity are set. Thus, as the relational expressions for calculating the refrigerant quantity in the portion other than the refrigerant communication pipes 6 and 7, it is possible to use the relational expressions in which a calculation error due to the change in the refrigerant quantity in the refrigerant communication pipes 6 and 7 is not easily generated. As a result, the accuracy for judging the adequacy of the refrigerant quantity in the refrigerant circuit 10 can be further improved.

(C)

In the air conditioner 1 in the present embodiment, the portion other than the refrigerant communication pipes 6 and 7 is divided into the outdoor unit 2 and the indoor units 4 and 5, and the relational expressions between the refrigerant quantity in each portion and the operation state quantity are set. Thus, even when the outdoor unit 2 and the indoor units 4 and 5 are interconnected in various combinations, the relational expressions separately provided for the outdoor unit 2 and the indoor units 4 and 5 can be used. As a result, the accuracy for judging the adequacy of the refrigerant quantity in the refrigerant circuit 10 can be further improved.

(D)

In the air conditioner 1 in the present embodiment, the outdoor unit 2 is divided into the outdoor heat exchanger 23 as the heat source side heat exchanger (i.e., condenser portion A), and the portion other than the outdoor heat exchanger 23 (here, the high pressure gas pipe portion F, the high temperature liquid pipe portion B1, the low temperature liquid pipe portion B2, the low pressure gas pipe portion H, and the bypass circuit portion I), and the relational expressions between the refrigerant quantity in each portion and the operation state quantity are set. Additionally, as the operation state quantity used in the relational expression for calculating the refrigerant quantity in the outdoor heat exchanger 23, the refrigerant circulation flow rate Wc or the operation state quantity (for example, the evaporation temperature Te, the condensation temperature Tc, or the like) equivalent to the refrigerant circulation flow rate Wc is included. Thus, it is possible to prevent a calculation error due to the difference in the refrigerant circulation flow rate Wc from being easily generated. As a result, the accuracy for judging the adequacy of the refrigerant quantity in the refrigerant circuit 10 can be further improved.

(E)

In the air conditioner 1 in the present embodiment, as the operation state quantity used in the relational expressions for calculating the refrigerant quantity in the indoor units 4 and 5, the air flow rate Wr of the indoor fans 43 and 53 as the ventilation fans or the operation state quantity (for example, the tap of the fan or the like) equivalent to the air flow rate Wr is included. Thus, it is possible to prevent a calculation error due to the difference in the air flow rate Wr from being easily generated. As a result, the accuracy for judging the adequacy of the refrigerant quantity in the refrigerant circuit 10 can be further improved.

(F)

In the air conditioner 1 in the present embodiment, the subcooler 25 is disposed as the temperature adjustment mechanism capable of adjusting the temperature of the refrigerant sent from the outdoor heat exchanger 23 as a condenser to the indoor expansion valves 41 and 51 as expansion mechanisms. Performance of the subcooler 25 is controlled such that the temperature Tlp of the refrigerant sent from the subcooler 25 to the indoor expansion valves 41 and 51 as expansion mechanisms is maintained constant during the refrigerant quantity judging operation, thereby preventing a change in the density $\rho lp$ of the refrigerant in the refrigerant pipes from the subcooler 25 to the indoor expansion valves 41 and 51. Therefore, even when the refrigerant temperature Tco at the outlet of the outdoor heat exchanger 23 as a condenser is different each time the refrigerant quantity judging operation is performed, the effect of the temperature difference of the refrigerant as described above will remain only within the refrigerant pipes from the outlet of the outdoor heat exchanger 23 to the subcooler 25, and the error in judgment due to the difference in the temperature Tco of the refrigerant at the outlet of the outdoor heat exchanger 23 (i.e., the difference in the density of the refrigerant) can be reduced when judging the refrigerant quantity.

In particular, as is the case with the present embodiment where the outdoor unit 2 as a heat source unit and the indoor units 4 and 5 as utilization units are interconnected via the liquid refrigerant communication pipe 6 and the gas refrigerant communication pipe 7, the lengths, pipe diameters and the like of the refrigerant communication pipes 6 and 7 that connect between the outdoor unit 2 and the indoor units 4 and 5 are different depending on conditions such as installation location. Therefore, when the volumes of the refrigerant communication pipes 6 and 7 are large, the difference in the refrigerant temperature Tco at the outlet of the outdoor heat exchanger 23 will be the difference in the temperature of the refrigerant in the liquid refrigerant communication pipe 6 that configures a large portion of the refrigerant pipes from the outlet of the outdoor heat exchanger 23 to the indoor expansion valves 41 and 51 and thus the error in judgment tends to increase. However, as described above, along with the disposition of the subcooler 25, performance of the subcooler 25 is controlled such that the temperature Tlp of the refrigerant in the liquid refrigerant communication pipe 6 is constant during the refrigerant quantity judging operation, thereby preventing a change in the density $\rho lp$ of the refrigerant in the refrigerant pipes from the subcooler 25 to the indoor expansion valves 41 and 51. As a result, the error in judgment due to the difference in the temperature Tco of the refrigerant at the outlet of the outdoor heat exchanger 23 (i.e., the difference in the density of the refrigerant) can be reduced when judging the refrigerant quantity.

For example, during the automatic refrigerant charging operation in which the refrigerant is charged into the refrigerant circuit 10, it is possible to judge with high accuracy whether or not the refrigerant quantity in the refrigerant circuit 10 has reached the target charging value Mi. In addition, during the initial refrigerant quantity detection operation in which the initial refrigerant quantity after constituent equipment is installed or after the refrigerant is charged into the refrigerant circuit 10 is detected, the initial refrigerant quantity can be detected with high accuracy. In addition, during the refrigerant leak detection operation in which whether or not there is a refrigerant leak from the refrigerant circuit 10 is judged, whether or not there is a refrigerant leak from the refrigerant circuit 10 can be judged with high accuracy.

In addition, in the air conditioner 1 in the present embodiment, a change in the density $\rho gp$ of the refrigerant sent from the indoor heat exchangers 42 and 52 to the compressor 21 is prevented by controlling constituent equipment such that the pressure (for example, the suction pressure Ps and the evaporation pressure Pe) of the refrigerant sent from the indoor heat exchangers 42 and 52 as evaporators to the compressor 21 or the operation state quantity (for example, the evaporation temperature Te) equivalent to the aforementioned pressure becomes constant during the refrigerant quantity judging operation. As a result, the error in judgment due to the difference (i.e., the difference in the density of the refrigerant) in the pressure of the refrigerant at the outlets of the indoor heat exchangers 42 and 52 or the operation state quantity equivalent to the aforementioned pressure can be reduced when judging the refrigerant quantity.

(G)

In the air conditioner 1 in the present embodiment, the pipe volume judging operation is performed in which two states are created where the density of the refrigerant flowing in the refrigerant communication pipes 6 and 7 is different between the two states. Then, the increase/decrease quantity of the refrigerant between these two states is calculated from the refrigerant quantity in the portions other than the refrigerant communication pipes 6 and 7, and the increase/decrease quantity of the refrigerant is divided by the density change quantity of the refrigerant in the refrigerant communication pipes 6 and 7 between the first state and the second state, thereby the volumes of the refrigerant communication pipes 6 and 7 are calculated. Therefore, for example, even when the volumes of the refrigerant communication pipes 6 and 7 are unknown at the time of after installation of constituent equipment, the volumes of the refrigerant communication pipes 6 and 7 can be detected. Accordingly, the volumes of the refrigerant communication pipes 6 and 7 can be obtained while reducing the labor of inputting information of the refrigerant communication pipes 6 and 7.

Also, in the air conditioner 1, the adequacy of the refrigerant quantity in the refrigerant circuit 10 can be judged by using the volumes of the refrigerant communication pipes 6 and 7 calculated by the pipe volume calculating means and the operation state quantity of constituent equipment or refrigerant flowing in the refrigerant circuit 10. Therefore, even when the volumes of the refrigerant communication pipes 6 and 7 are unknown at the time of after installation of constituent equipment, the adequacy of the refrigerant quantity in the refrigerant circuit 10 can be judged with high accuracy.

For example, even when the volumes of the refrigerant communication pipes 6 and 7 are unknown at the time of after installation of constituent equipment, the refrigerant quantity in the refrigerant circuit 10 in the initial refrigerant quantity judging operation can be calculated by using the volumes of the refrigerant communication pipes 6 and 7 calculated by the pipe volume calculating means. In addition, even when the volumes of the refrigerant communication pipes 6 and 7 are unknown at the time of after installation of constituent equipment, the refrigerant quantity in the refrigerant circuit 10 in the refrigerant leak detection operation can be calculated by using the volumes of the refrigerant communication pipes 6 and 7 calculated by the pipe volume calculating means. Accordingly, it is possible to detect the initial refrigerant quantity necessary for detecting a refrigerant leak from the refrigerant circuit 10 and judge with high accuracy whether or not the refrigerant is leaking from the refrigerant circuit 10 while reducing the labor of inputting information of the refrigerant communication pipes.

(H)

In the air conditioner 1 in the present embodiment, the volume Vlp of the liquid refrigerant communication pipe 6 and the volume Vgp of the gas refrigerant communication pipe 7 are calculated from the information regarding the liquid refrigerant communication pipe 6 and the gas refrigerant communication pipe 7 (for example, operation results of the pipe volume judging operation and information regarding the lengths, pipe diameters and the like of the refrigerant communication pipes 6 and 7, which is input by the operator and the like). Then, based on the results obtained by calculating the volume Vlp of the liquid refrigerant communication pipe 6 and the volume Vgp of the gas refrigerant communication pipe 7, whether or not the information regarding the liquid refrigerant communication pipe 6 and the gas refrigerant communication pipe 7 used for the calculation is adequate is judged. Therefore, when it is judged to be adequate, the volume Vlp of the liquid refrigerant communication pipe 6 and the volume Vgp of the gas refrigerant communication pipe 7 can be accurately obtained; whereas when it is judged to be inadequate, it is possible to handle the situation by, for example, re-inputting appropriate information regarding the liquid refrigerant communication pipe 6 and the gas refrigerant communication pipe 7, re-performing the pipe volume judging operation, and the like. Moreover, such judgment method is not to judge the adequacy by individually checking the volume Vlp of the liquid refrigerant communication pipe 6 and the volume Vgp of the gas refrigerant communication pipe 7 obtained by the calculation, but to judge the adequacy by checking whether or not the volume Vlp of the liquid refrigerant communication pipe 6 and the volume Vgp of the gas refrigerant communication pipe 7 satisfy a predetermined relation. Therefore, an appropriate judgment can be made which also takes into consideration a relative relation between the volume Vlp of the liquid refrigerant communication pipe 6 and the volume Vgp of the gas refrigerant communication pipe 7.

(4) Other Embodiment

While preferred embodiment of the present invention has been described with reference to the figures, the scope of the present invention is not limited to the above embodiments, and the various changes and modifications may be made without departing from the scope of the present invention.

For example, in the above described embodiment, an example in which the present invention is applied to an air conditioner capable of switching and performing the cooling operation and heating operation is described. However, it is not limited thereto, and the present invention may be applied to different types of air conditioners such as a cooling only air conditioner and the like. In addition, in the above described embodiment, an example in which the present invention is applied to an air conditioner including a single outdoor unit is described. However, it is not limited thereto, and the present invention may be applied to an air conditioner including a plurality of outdoor units.

INDUSTRIAL APPLICABILITY

When the present invention is used, it is possible to judge the adequacy of the refrigerant quantity in a refrigerant circuit with high accuracy while reducing the calculation load.

What is claimed is:

1. An air conditioner comprising:
a refrigerant circuit divided into a plurality of portions, the refrigerant circuit being configured to interconnect a compressor, a heat source side heat exchanger, and a utilization side heat exchanger;
a refrigerant quantity calculating section configured to use a relational expression between the refrigerant quantity in each portion of the refrigerant circuit and an operation state quantity of constituent equipment or refrigerant flowing in the refrigerant circuit in order to calculate the refrigerant quantity in each of the portions from the operation state quantity of constituent equipment or refrigerant flowing in the refrigerant circuit; and
a refrigerant quantity judging section configured to use the refrigerant quantity in each of the portions calculated by the refrigerant quantity calculating section in order to judge the adequacy of the refrigerant quantity in the refrigerant circuit,
the refrigerant circuit including a refrigerant communication pipe that interconnects a heat source unit and a utilization unit, the heat source unit including the compressor and the heat source side heat exchanger, and the utilization unit including the utilization side heat exchanger, and
the relational expressions being separately set for the refrigerant communication pipe and a portion other than the refrigerant communication pipe, and the refrigerant circuit being divided into these portions.

2. The air conditioner according to claim 1, wherein the relational expressions are separately set for the heat source unit and the utilization unit, and the portion other than the refrigerant communication pipe is divided into these portions.

3. The air conditioner according to claim 1, wherein
the refrigerant quantity calculating section uses the relational expressions in order to calculate the refrigerant quantity in each of the portions from the operation state quantity of constituent equipment or refrigerant flowing in the refrigerant circuit in an automatic refrigerant charging operation in which the refrigerant is charged into the refrigerant circuit, and
the refrigerant quantity judging section uses the refrigerant quantity in each of the portions calculated by the refrigerant quantity calculating section in order to judge whether or not the refrigerant quantity in the refrigerant circuit has reached a target charge value.

4. The air conditioner according to claim 1, wherein
the refrigerant quantity calculating section uses the relational expressions in order to calculate the refrigerant quantity in each of the portions from the operation state quantity of constituent equipment or refrigerant flowing in the refrigerant circuit in an initial refrigerant quantity detection operation in which initial refrigerant quantity after constituent equipment is installed or after the refrigerant is charged into the refrigerant circuit is detected, and thereby detects the initial refrigerant quantity.

5. The air conditioner according to claim 1, wherein
the refrigerant quantity calculating section uses the relational expressions in order to calculate the refrigerant quantity in each of the portions from the operation state quantity of constituent equipment or refrigerant flowing in the refrigerant circuit in a refrigerant leak detection operation in which whether or not the refrigerant is leaking from the refrigerant circuit is judged, and
the refrigerant quantity judging section compares the refrigerant quantity in each of the portions calculated by the refrigerant quantity calculating section with a reference refrigerant quantity that serves as the reference for judging whether or not there is a leak, and thereby judges whether or not the refrigerant is leaking from the refrigerant circuit.

6. The air conditioner according to claim 1, wherein
the refrigerant communication pipe includes a liquid refrigerant communication pipe portion and a gas refrigerant communication pipe portion.

7. An air conditioner comprising:
a refrigerant circuit divided into a plurality of portions, the refrigerant circuit being configured to interconnect a compressor, a heat source side heat exchanger, and a utilization side heat exchanger;
a refrigerant quantity calculating section configured to use a relational expression between the refrigerant quantity in each portion of the refrigerant circuit and an operation state quantity of constituent equipment or refrigerant flowing in the refrigerant circuit in order to calculate the refrigerant quantity in each of the portions from the operation state quantity of constituent equipment or refrigerant flowing in the refrigerant circuit; and
a refrigerant quantity judging section configured to use the refrigerant quantity in each of the portions calculated by the refrigerant quantity calculating section in order to judge the adequacy of the refrigerant quantity in the refrigerant circuit,
the refrigerant circuit including a refrigerant communication pipe that interconnects a heat source unit and a utilization unit, the heat source unit including the compressor and the heat source side heat exchanger, and the utilization unit including the utilization side heat exchanger,
the relational expressions being separately set for the refrigerant communication pipe and a portion other than the refrigerant communication pipe, and the refrigerant circuit being divided into these portions,
the relational expressions being separately set for the heat source unit and the utilization unit, and the portion other than the refrigerant communication pipe is divided into these portions,
the relational expressions being separately set for the heat source side heat exchanger and a portion other than the heat source side heat exchanger, and the heat source unit being divided into these portions, and
the relational expression set for the refrigerant quantity in the heat source side heat exchanger including a refrigerant circulation flow rate or an operation state quantity equivalent to the refrigerant circulation flow rate as the operation state quantity of constituent equipment or refrigerant flowing in the refrigerant circuit.

8. The air conditioner according to claim 7, wherein
the utilization unit further includes a ventilation fan that supplies air to the utilization side heat exchanger, and
the relational expression set for the refrigerant quantity in the utilization unit includes an air flow rate of the ventilation fan or an operation state quantity, and the operation state quantity is equivalent to the air flow rate as the operation state quantity of constituent equipment or refrigerant flowing in the refrigerant circuit.

9. The air conditioner according to claim 8, wherein
the refrigerant quantity calculating section uses the relational expressions in order to calculate the refrigerant quantity in each of the portions from the operation state quantity of constituent equipment or refrigerant flowing in the refrigerant circuit in an automatic refrigerant charging operation in which the refrigerant is charged into the refrigerant circuit, and
the refrigerant quantity judging section uses the refrigerant quantity in each of the portions calculated by the refrigerant quantity calculating section in order to judge whether or not the refrigerant quantity in the refrigerant circuit has reached a target charge value.

10. The air conditioner according claim 9, wherein
the refrigerant quantity calculating section uses the relational expressions in order to calculate the refrigerant quantity in each of the portions from the operation state quantity of constituent equipment or refrigerant flowing in the refrigerant circuit in an initial refrigerant quantity detection operation in which initial refrigerant quantity after constituent equipment is installed or after the refrigerant is charged into the refrigerant circuit is detected, and thereby detects the initial refrigerant quantity.

11. The air conditioner according to claim 10, wherein
the refrigerant quantity calculating section uses the relational expressions in order to calculate the refrigerant quantity in each of the portions from the operation state quantity of constituent equipment or refrigerant flowing in the refrigerant circuit in a refrigerant leak detection operation in which whether or not the refrigerant is leaking from the refrigerant circuit is judged, and
the refrigerant quantity judging section compares the refrigerant quantity in each of the portions calculated by the refrigerant quantity calculating section with a reference refrigerant quantity that serves as the reference for judging whether or not there is a leak, and thereby judges whether or not the refrigerant is leaking from the refrigerant circuit.

12. An air conditioner comprising:
a refrigerant circuit divided into a plurality of portions, the refrigerant circuit being configured to interconnect a compressor, a heat source side heat exchanger, and a utilization side heat exchanger;
a refrigerant quantity calculating section configured to use a relational expression between the refrigerant quantity in each portion of the refrigerant circuit and an operation state quantity of constituent equipment or refrigerant flowing in the refrigerant circuit in order to calculate the refrigerant quantity in each of the portions from the operation state quantity of constituent equipment or refrigerant flowing in the refrigerant circuit; and
a refrigerant quantity judging section configured to use the refrigerant quantity in each of the portions calculated by the refrigerant quantity calculating section in order to judge the adequacy of the refrigerant quantity in the refrigerant circuit,
the refrigerant circuit including a refrigerant communication pipe that interconnects a heat source unit and a utilization unit, the heat source unit including the compressor and the heat source side heat exchanger, and the utilization unit including the utilization side heat exchanger, the relational expressions being separately set for the refrigerant communication pipe and a portion other than the refrigerant communication pipe, and the refrigerant circuit being divided into these portions, the relational expressions being separately set for the heat source unit and the utilization unit, and the portion other than the refrigerant communication pipe is divided into these portions, the utilization unit further a ventilation fan that supplies air to the utilization side heat exchanger, and the relational expression set for the refrigerant quantity in the utilization unit including an air flow rate of the ventilation fan or an operation state quantity, and the operation state quantity being equivalent to the air flow rate as the operation state quantity of constituent equipment or refrigerant flowing in the refrigerant circuit.

* * * * *